US008260846B2

(12) United States Patent
Lahav

(10) Patent No.: US 8,260,846 B2

(45) Date of Patent: Sep. 4, 2012

(54) METHOD AND SYSTEM FOR PROVIDING TARGETED CONTENT TO A SURFER

(75) Inventor: Shlomo Lahav, Ramat-Gan (IL)

(73) Assignee: LivePerson, Inc., New York, NY (US)

( * ) Notice: Subject to any disclaimer, the term of this patent is extended or adjusted under 35 U.S.C. 154(b) by 242 days.

(21) Appl. No.: 12/503,925

(22) Filed: Jul. 16, 2009

(65) Prior Publication Data

US 2010/0023581 A1 Jan. 28, 2010

Related U.S. Application Data

(60) Provisional application No. 61/083,551, filed on Jul. 25, 2008, provisional application No. 61/083,558, filed on Jul. 25, 2008.

(51) Int. Cl.
*G06F 15/16* (2006.01)
*G06Q 30/00* (2012.01)

(52) U.S. Cl. .................... 709/203; 705/14.4; 705/14.41; 705/14.49

(58) Field of Classification Search .................. 709/203; 705/14.4, 14.43, 14.49; 715/745
See application file for complete search history.

(56) References Cited

U.S. PATENT DOCUMENTS 5,918,014 A 6/1999 Robinson
6,662,215 B1 12/2003 Moskowitz et al.
6,826,594 B1 11/2004 Pettersen
6,904,408 B1 * 6/2005 McCarthy et al. ................ 705/2
7,287,000 B2 * 10/2007 Boyd et al. ................. 705/14.43
7,313,575 B2 * 12/2007 Carr et al. ............................ 1/1
7,370,002 B2 * 5/2008 Heckerman et al. ....... 705/14.41
7,702,635 B2 * 4/2010 Horvitz et al. ................ 709/203
7,966,564 B2 * 6/2011 Catlin et al. ................. 715/745
2002/0002491 A1 1/2002 Whitfield
2002/0082923 A1 * 6/2002 Merriman et al. .............. 705/14
2003/0014304 A1 1/2003 Calvert et al.
2007/0053513 A1 * 3/2007 Hoffberg ..................... 380/201
2007/0100688 A1 5/2007 Book
2007/0162501 A1 7/2007 Agassi et al.
2007/0239527 A1 10/2007 Nazer et al.
2008/0147480 A1 6/2008 Sarma et al.
2009/0030859 A1 1/2009 Buchs et al.
2010/0023475 A1 * 1/2010 Lahav ............................ 706/59
2011/0112893 A1 * 5/2011 Karlsson et al. ............ 705/14.4

* cited by examiner

*Primary Examiner* — Asghar Bilgrami

(74) *Attorney, Agent, or Firm* — Smith Risley Tempel Santos LLC; Gregory Scott Smith

(57) ABSTRACT

A system and method for providing targeted content to a surfer is disclosed. Exemplary embodiments of the present invention seek to provide novel solutions for determining which content object, taken from a group of content objects, will be best suited for presentation in association with a link on a web page that has been requested by a certain surfer. Exemplary types of content objects may comprise the text, topic, font, color or other attribute of an external advertisement or internal advertisement. Still other content objects may comprise the specific design of the object, an image, the design of the page in which the object is presented, etc. The decision process for selecting a content object can be based on predictive information that is associated with the request, such as a common HTTP request, or historical information about the surfer. Exemplary associated predictive information may include the day and time of receipt of the request for the web page, the IP address and\or domain from which the request was sent, the type and the version of the browser application that is used for requesting the web page, or the URL used by a surfer for requesting the web page with the parameters that are attached to the URL.

20 Claims, 11 Drawing Sheets

100
110
Surfer's Terminal (ST)
110
Surfer's Terminal (ST)
110
Surfer's Terminal (ST)
120
A Network (the Internet, for example)
140
Improved Content Server (ICS)
146
Content Adaptive Module (CAM)
143
Surfer's Interaction Unit (SIU)
150
Adaptive Content Domain (ACD)
Content Adaptive Server (CAS)
154
Content Server
152
Content Server
152

METHOD AND SYSTEM FOR PROVIDING TARGETED CONTENT TO A SURFER

CROSS-REFERENCE TO RELATED APPLICATIONS

This application claims the benefit of the filing date of U.S. Provisional Application for Patent entitled METHOD AND SYSTEM FOR PROVIDING TARGETED CONTENT TO A SURFER, filed on Jul. 25, 2008 and assigned Ser. No. 61/083,551 as well as the filing date of U.S. Provisional Application for Patent entitled METHOD AND SYSTEM FOR CREATING A PREDICTIVE MODEL FOR TARGETING CONTENT TO A SURFER, filed on Jul. 25, 2008 and assigned Ser. No. 61/083,558.

This application is related to a U.S. patent application that has a title of METHOD AND SYSTEM FOR CREATING A PREDECTIVE MODEL FOR TARGETING WEBPAGE TO A SURFER, which was filed concurrently with this application and is hereby incorporated by reference in its entirety.

BACKGROUND

More and more people are communicating via the Internet and other networks. The Internet, in particular, is a hierarchy of many smaller computer networks, all of which are interconnected by various types of server computers. Some of the servers interconnected through the Internet provide database housing as well as storage of a plurality of web pages, generally referred to as the World Wide Web (WWW). By virtue of being accessible through the WWW, these web pages may be retrieved by random Internet users, i.e. surfers, operating computers with a browser.

Some common examples of browser applications used by Internet surfers are Openwave Systems Inc. or Opera Mobile Browser (a trademark of Opera Software ASA), Microsoft Internet Explorer (a trademark of Microsoft), and Firefox Web Browser. Using a web browser application on a computer that is connected to the Internet, surfers may retrieve web pages that include information such as news, professional information, advertisements, e-commerce links, content downloads, etc. A common browser application may use Hyper Text Transport Protocol (HTTP) in order to request a web page from a website. Upon receipt of a web page request by a browser, the website responds by transmitting a markup language file, such as Hypertext Markup Language (HTML), that is representative of the requested page or pages. Notably, HTTP requests and HTML responses are well known in the art and are used as representative terms for the respective markup language files throughout this disclosure.

A common web page may include numerous buttons, or links, operable to redirect a surfer to other locations within the website or on the Internet. These links offer a surfer a path to a next event which may be the presentation of another web page, embedded content within the present web page (e.g. an image, an advertisement, a banner, etc.), a playable media file, a number for forwarding a short message service (SMS) with a password, an application form, a registration form, etc.

A common link design may display a name of a category of information, such as news, sport, or economics. Other link designs may comprise a banner or an image intended to attract the attention of a surfer to an advertisement, an image, a text message that prompts the surfer to dial a number and use a password, etc. If a surfer is enticed to explore the offer shown on the link design, the surfer will use a pointing device such as a mouse, and place the pointer over the selected button, which may be comprised of a banner for example, and issue a command by "clicking" the mouse to "click through" on that button. In such a scenario, the surfer's browser may return information from a website associated with the particular banner that comprised the link.

In the present description, the terms "selecting button," "selection button," "redirecting button," "slot", "link," "Hyper Link" and "banner" are used interchangeably. The terms "banner" and "slot" can be used as a representative term for the above group. An "advertisement" (AD) or "object" may be used as representative terms for content. Exemplary types of content can be the text of an AD as well as an AD's font, color, design of the object, an image, the design of the page in which the object is presented, etc.

The benefit from presenting a web page, as well as improving a surfer's experience when surfing the web page, can be increased if the selection buttons within the web page are targeted toward the immediate observer. There are numerous existing methods and systems for offering targeted content in a web based environment. Some of the methods employ questionnaires containing categorized questions on user preferences. Such methods require the management of huge databases containing information on a large number of users. Besides the cumbersome management of all the information acquired from questionnaires, another negative is that many users prefer not to even reply to a personalize questionnaire.

Other methods for identifying and offering targeted content in a web environment make use of client applications installed on a user's computer. The client applications are operable to track a user's activity on the web and subsequently report a compilation of the tracked activity to an associated web server or content server. Such methods are not popular with many users concerned with privacy. Further, such methods require the often costly and awkward installation of a client application on a user's computer.

Some methodologies for delivery of targeted content may comprise a learning period and an ongoing period. During the learning period, a plurality of options of content within a certain web page may be presented to various surfers. The response of the surfers to the various content options is monitored throughout the learning period in anticipation of ultimately employing the best performing alternative. During the subsequent ongoing period, all a surfers requesting the certain web page will be exposed to the previously selected alternative. Such an algorithm is often referred to as "The king of the Hill" algorithm. While a "King of the Hill" approach can fit the preference of a large group of surfers, it is prone to missing other groups of surfers that prefer other content delivery alternatives.

Therefore, there is a need in the art for a method and system that can calculate predictive models for determining an object to be presented in association with a given link in a web page used to attract an observer and entice a response. Exemplary responses may be the selection, or clicking of, a the link (banner, for example), sending of an SMS, calling a number and using a password, etc. In an embodiment of the present invention, when calculating the predictive model the expected value to the content provider is taken into account. In order to save expenses and complexity, it is recommended that the system be transparent to a surfer and will not require a database for storing information associated with a number of surfers.

BRIEF SUMMARY

Exemplary embodiments of the present invention seek to provide novel solutions for determining which content object taken from a group of content objects will be best suited for presentation in association with a link on a requested web page. Exemplary types of content objects may comprise the text, topic, font, color or other attribute of an advertisement. Still other content objects may comprise the specific design of the object, an image, the design of the page in which the object is presented, etc. The decision process for selecting a content object can be based on predictive information that is associated with the request, such as a common HTTP request. Exemplary associated predictive information may include the day and time of receipt of the request for the web page, the IP address and\or domain from which the request was sent, the type and the version of the browser application that is used for requesting the web page, the URL used by a surfer for requesting the web page with the parameters that are attached to the URL.

Other types of predictive information can be statistical information indicative of the behavior of a surfer in relation to the website to which the request was sent. Behavioral information may include timers, frequency of visits by a surfer to the website, the last time that a surfer requested a web page, etc. Other behavioral information may include one or more counters wherein each counter can count the number of events of a certain type. Exemplary counters can measure the number of visits by a specific surfer to the relevant website, the number of requests for a certain web page within the website, the number of times a certain offer (content object) was selected or not selected, etc. Even further, some of the exemplary counters may be time dependent such that the value of the counter descends over time. In some exemplary embodiments of the present invention, the behavioral information may be embedded within a cookie that is related to the relevant website or a third party cookie.

Still other exemplary types of predictive information comprise grouping or categorizing information. Grouping information can be delivered by a web server that contains a requested web page. The grouping information can be associated with a group to which a current surfer belongs—surfer's grouping information (SGI). Exemplary surfer's grouping information can be used to define attributes of the group such as preferred sport clothing, preferred brand names, married status, sex, age, etc. Surfer's grouping information can be managed by the web server and added to a field in a cookie associated with a certain surfer, for example.

Other grouping predictive information can reflect attributes of the content-content grouping information (CGI). The CGI can be related to the requested web page as well as attributes of the content objects presented in the requested web page. Exemplary CGI can define attributes of the page or the content object such as the cost of a product, a product brand, vacation information, etc. CGI can be managed by the web server and added to a field in the URL of a certain web page or URL of a certain content object, for example.

Each type of predictive information, associated predictive information, predictive statistical information and grouping predictive information can be retrieved and processed for defining one or more predictive factors which can be used in one or more predictive models. The predictive factors are used for calculating the predictive value gained by the website when presenting each content element. This value can also be the probability of a certain content object from a group to be selected by a surfer currently observing the requested web page.

An alternative is to use a utility value. A utility value can represent a website's benefit when the alternative is explored by a surfer. The probability can be multiplied by the associated utility to obtain the expected utility when presenting the alternative. In the present description, the terms "predictive information," "predictive factor," and "predictive variable" may be used interchangeably.

An exemplary embodiment of the present invention can use a bank of predictive models. Each predictive model can be associated with a content object from the set of content objects that can be presented over the requested web page. An exemplary predictive model may include one or more predictive factors with each predictive factor (predictive variable) being associated with a coefficient in a predictive formula. Exemplary predictive formulas can be based on known predictive algorithms such as, but not limited to, logistic regression, linear regression, decision tree analysis, etc. Some exemplary embodiments of the present invention can use linear or logistic regression, with or without stepwise methods, while calculating the predictive formula.

A predictive factor can also be a subset of values of certain variables such as, for example, the weekdays Monday and Saturday. The coefficient can thus outline the effect a predictive factor has on the probability that a relevant content object will trigger a desired response from a surfer. Exemplary predictive factors may include, for example, the day in the week (Monday and Saturday, for example), the hour, the browser type, the number of visits to the site, the content object that is presented in accordance with another link on the same web page, the total elapsed time from the last visit, etc.

Exemplary predictive models can include some constants that are related to the content object associated with the model. Exemplary constants may be a utility constant which reflects the benefits the owner of the website receives when the relevant content object is selected or an arithmetic factor.

For each content object presented over a requested web page, a predictive model with relevant predictive factors is processed such that the predicted objective, the probability of success for example, is calculated. A success is defined as a surfer responding to the presented content. For example, should a surfer select a relevant content object, the probability of the objects that can be presented is calculated. Subsequently, the objects with the highest predictive expected utility are selected to be associated with the links in the web page requested by the surfer. The markup file that represents the web page is modified such that its links point to the selected objects. The predictive objective value can be calculated to correspond to the predictive model. For example, in the logistic regression predictive model, the optimal linear predictive function is calculated and converted using a link function such as "Log Odds,"

Another exemplary embodiment of the present invention may include a learning module. An exemplary learning module may be adapted to monitor the data exchange between a plurality of random surfers at one or more websites. Further, it can collect predictive information on content objects embedded within the requested web pages as well as track how each of the random surfers responds to those offers. From time to time, the exemplary learning module can process the sampled data in order to determine which predictive factors are relevant for each one of the objects and calculated an associated coefficient for success. Per each object, its associated statistical module can be updated or recalculated using the new or updated predictive factors.

An exemplary embodiment of the present invention operates in either of two modes of operation, i.e. learning mode and ongoing mode. The learning mode can be executed after the initialization or when the content of the website is changed. During the learning mode, new predictive models are calculated. The ongoing mode can be executed after the learning mode and may monitor and tune existing predictive models. During the learning mode, a large portion of communication sessions are sampled in order to define the new predictive models. Also during the ongoing mode, the size of the sample can be reduced and the predictive model tuned. When a significant change in the performance of a predictive model is observed, then a notification can be issued and/or a new predictive model can be created The foregoing summary is not intended to summarize each potential embodiment or every aspect of the present disclosure. Other features and advantages of the present disclosure will become apparent upon reading the following detailed description of the embodiments with the accompanying drawings and appended claims.

BRIEF DESCRIPTION OF THE SEVERAL VIEWS OF THE DRAWING

Exemplary embodiments of the present invention will be understood and appreciated more fully from the following detailed description, taken in conjunction with the drawings in which.

DETAILED DESCRIPTION

The present invention relates to the presentation of data over communication networks, such as the Internet, and more particularly to selecting one or more objects (content of a web link) from a group of objects of content, to be presented over a requested web page.

Turning now to the figures in which like numerals represent like elements throughout the several views, exemplary embodiments of the present invention are described. For convenience, only some elements of the same group may be labeled with numerals. The purpose of the drawings is to describe exemplary embodiments. Therefore, features shown in the figures are chosen for convenience and clarity of presentation only.

Figure 1:
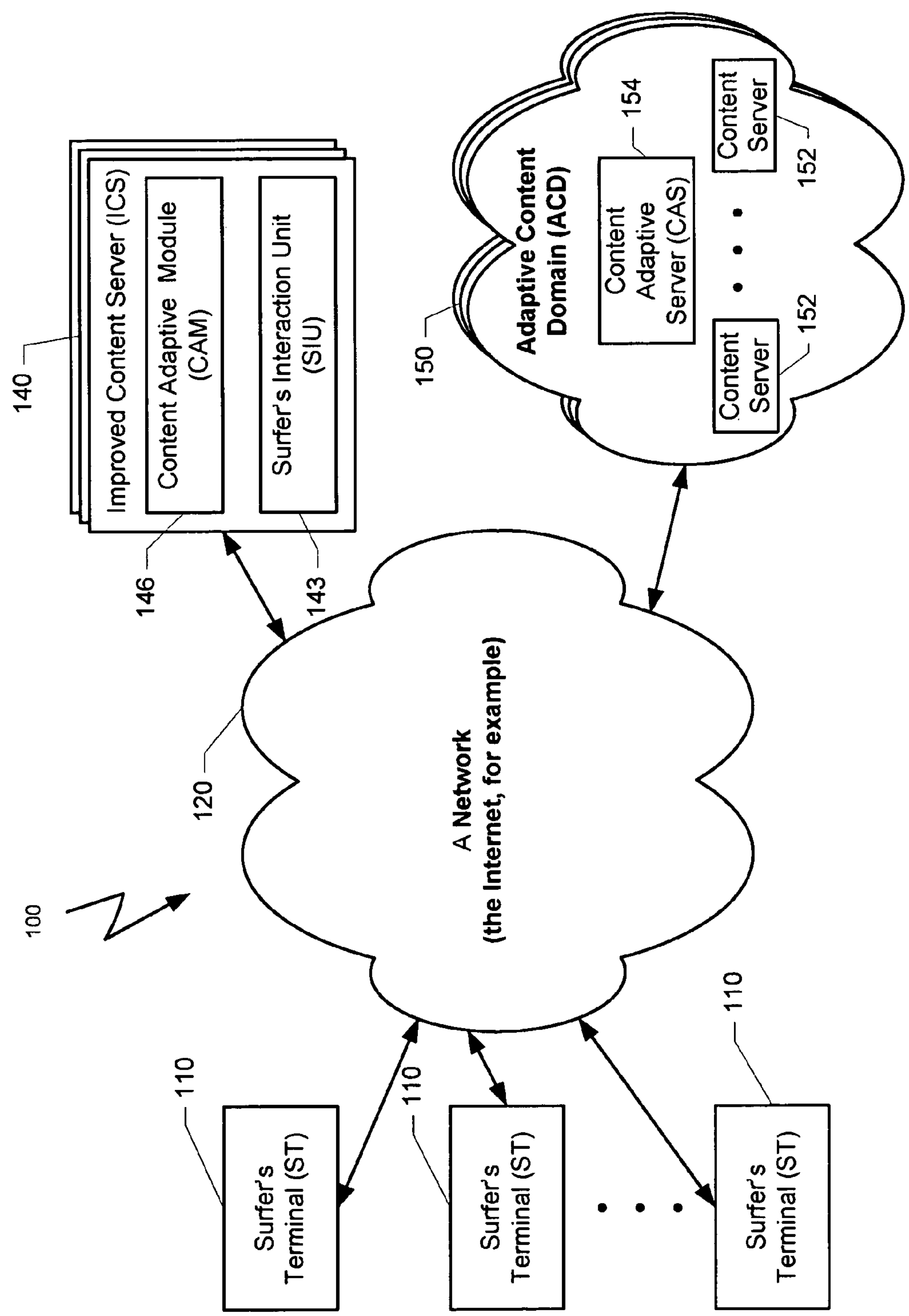
FIG. 1 is a simplified block diagram illustration of an exemplary portion of a communication network in which exemplary embodiments of the present invention can be used.

FIG. 1 depicts a block diagram with relevant elements of an exemplary communication system 100, which is a suitable environment for implementing exemplary embodiments of the present invention. Communication system 100 may comprise a plurality of surfer terminals (ST) 110; a network 120 such as, but not limited to, the Internet; one or more improved content servers ICS 140; and one or more adaptive content domains (ACD) 150.

The communications system 100 may be based on the Internet Protocol (IP) and represent one or more network segments including, but not limited to, one or more Internet segments, one or more Intranets, etc. Network 120 may run over one or more types of physical networks such as, but not limited to, Public Switched Telephone Network (PSTN), Integrated Services Digital Network (ISDN), cellular networks, satellite networks, etc. Further, network 120 may run over a combination of network types. Network 120 may also include intermediate nodes along the connection between a surfer and a content server. The intermediate nodes may include, but are not limited to, IP service provider servers, cellular service provider servers and other types of network equipment.

It will be appreciated by those skilled in the art that depending upon its configuration and the needs, communication system 100 may comprise more than three ST 110, three ICS 140 and three ACD 150. However, for purposes of simplicity of presentation, three units of each are depicted in the figures. Further, it should be noted that the terms "terminals," "endpoint computer," "endpoint," "surfer," "random surfer," "user's device," "mobile phone" and "user" may be used interchangeably herein.

A plurality of ST 110 may be served by system 100 for surfing the Internet 120 and fetching web pages from the one or more ICS 140 or ACD 150. Exemplary ST 110 can be a personal computer (PC), a laptop, a notebook computer, a cellular telephone, a handheld computer, a personal data assistant (PDA), or any other computing device with wired or wireless communication capabilities communicable over an IP network. A common ST 110 may run a browser application such as, but not limited to, Openwave Systems Inc. or Opera Mobile Browser (a trademark of Opera Software ASA), Microsoft Internet Explorer (a trademark of Microsoft), or Firefox Web Browser. The browser application can be used for rendering web pages. Exemplary web pages may include information such as news, professional information, advertisements, e-commerce content, etc.

A common browser application can use HTTP while requesting a web page from a website. The website can respond with a markup language file such as but not limited to HTML files. Herein the term HTML is used as a representative term for a markup language file. HTTP requests and HTML responses are well known in the art.

Exemplary ICS 140 and/or ACD 150 may receive HTTP requests from the plurality of ST 110 and deliver web pages in the form of markup language files such as, but not limited to, HTML files. An exemplary ICS 140 may comprise a surfer's interface unit (SIU) 143 and a content adaptive module (CAM) 146. Exemplary SIU 143 can execute common activities of a content server. Further, it may receive HTTP requests and respond with HTML files. In addition, exemplary SIU 143 may communicate with CAM 146 and/or deliver information about the activities of the different ST 110. The activity can be the web pages requested by the surfers, for example.

In some exemplary embodiments of the present invention, SIU 143 may deliver to CAM 146 information about surfer attributes. Exemplary attributes may be a surfer's purchasing habits (expensive, not-expensive, brand name, etc.). A specific surfer's information can be managed by the web server and be added to a field in the cookie associated with the particular surfer.

In some embodiments, the information can also be related to the requested web page as well as particular attributes of the content objects to be presented in the requested web page. Exemplary information that may define attributes of the web page or the content object include, but are not limited to, the cost of a product, the brand of a product, vacation information, etc. This type of information can be managed by the web server and added to a field in the URL of a certain web page or URL of a certain content object, for example.

CAM 146 may process requests of different surfers in order to create a plurality of predictive modules, wherein each predictive module can be associated with an optional object that is presented over a requested web page in one of the slots (redirection-button) from a set of optional slots. The predictive modules can be used to select an object that maximizes an expected benefit to the site owner. In the present description, the terms "expected benefit" and "expected utility" can be used interchangeably. The sets of slots, in which an optional object can be presented, and the selected optional object to be presented in each slot (Slot/Optional-object) can be defined within the configuration of the web page. The configuration of the object/redirection-buttons with the optimal prediction to be selected for the requesting surfer is transferred to SIU 143. In response, SIU 143 may modify the HTML file to include those objects in the relevant links.

Exemplary ACD 150 can include a plurality of common content servers 152 and one or more content adaptive servers (CAS) 154. CAS 154 can be connected as an intermediate node between the plurality of ST 110 and the content servers 152. In one exemplary embodiment, CAS 154 may be configured as the default gateway of the ACD 150. In another exemplary embodiment, CAS 154 may physically reside between the ACD 150 and the network 120.

In yet another exemplary embodiment of the present invention, a redirector may be included and CAS 154 configured as a transparent proxy. In such an embodiment, CAS 154 may be transparent to both sides of the connection, to ST 110 and to the content servers 152. In an alternate exemplary embodiment of the present invention CAS 154 may be used as a non-transparent proxy. In such an embodiment, the ST 110 can be configured to access CAS 154 as their proxy, for example.

CAS 154 can intercept the data traffic between the plurality of ST 110 and content servers 152. CAS 154 tracks the behavior of a plurality of surfers in order to create predictive models for content objects to be associated with requested web pages. Subsequently, when operating in an ongoing mode, the predictive models can be used for determining which objects to assign to a web page requested by a given surfer.

Toward ACD 150, CAS 154 can process requests of surfers, for retrieving a plurality of predictive factors to be used in a plurality of predictive modules, similar to the predictive modules that are used by exemplary CAM 146. In the other direction, CAS 154 can process the responses (the HTML files, for example) and determine, based on the predictive models, which object to present. The HTML file, which represents the web page, is modified to include those objects in the links. More information on the operation of ICS 140 and CAS 154 is disclosed below in conjunction with FIGS. 2 to 9.

Figure 2:
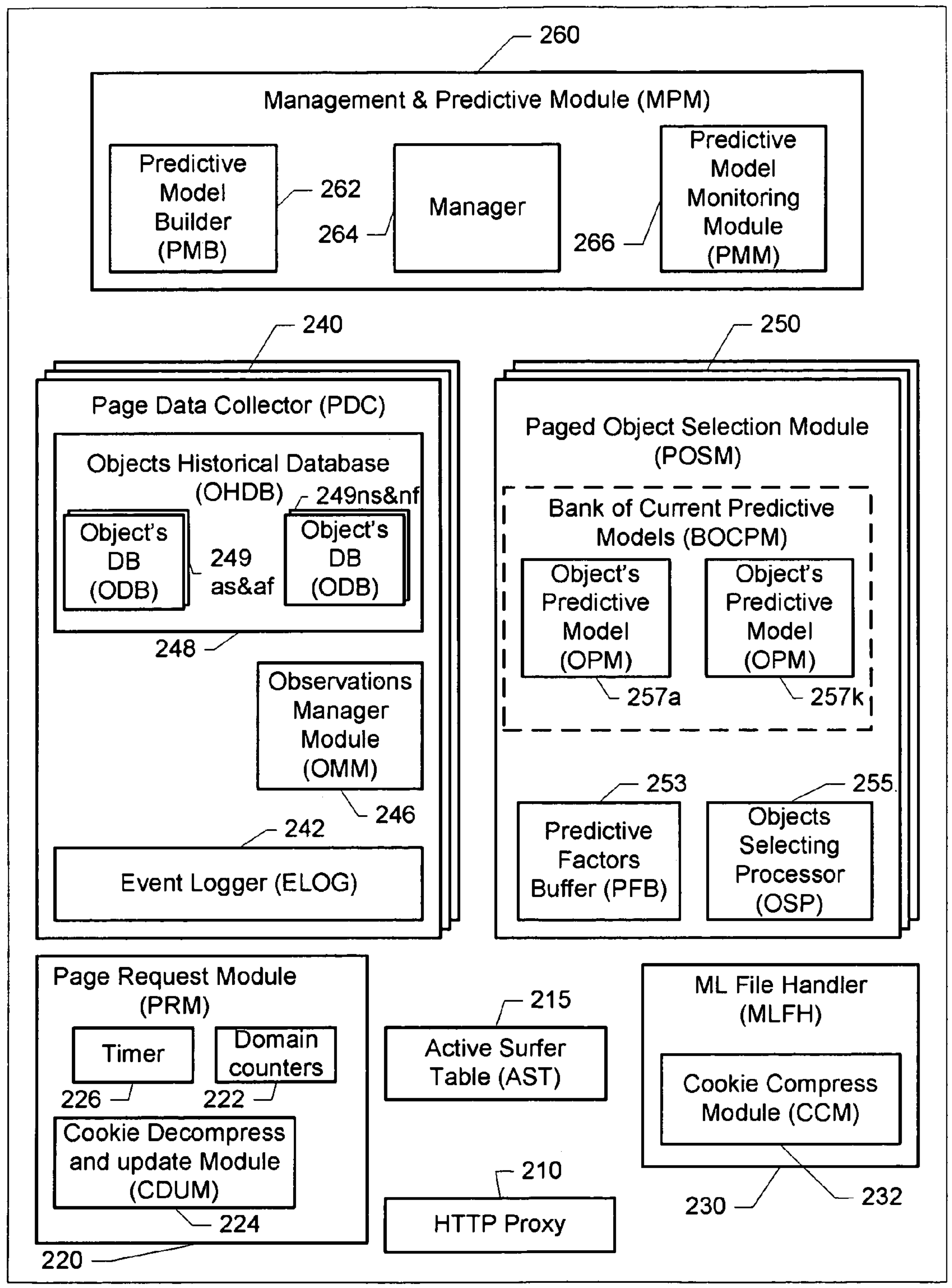
FIG. 2 schematically illustrates a simplified block diagram with relevant elements of an exemplary content adaptive server (CAS) that operates according to certain technique of the present disclosure.

FIG. 2 illustrates a block diagram with relevant elements of an exemplary embodiment of a content adaptive server (CAS) 200 that operates according to certain techniques of the present disclosure. Exemplary CAS 200 can be installed in association with ACD 150, as unit 154 (FIG. 1) for example. In one exemplary embodiment, CAS 200 may intercept the communication between the plurality of ST 110 and the plurality of content servers 152 (FIG. 1). CAS 200 can process surfer requests in order to track and learn about the behavior of each surfer. Based on learned information obtained from a plurality of surfers, CAS 200 can create a plurality of predictive models that correspond to given surfers. Each predictive model can be assigned to an object that is associated with a redirecting button in a requested web page.

After creating the predictive models, CAS 200 can use the models in order to determine which combination of optional objects can be associated with certain redirecting buttons in a requested web page such that the profit of the owner of the ACD 150 is maximized. This configuration is referred to as a predictive configuration of the web page. Markup language files, such as HTML files, are transferred from content servers 152 toward ST 110 and can be modified by CAS 200, for example, in order to match the predicted configuration.

The behavior of surfers can be monitored and learned during the ongoing operation of an exemplary CAS 200. The monitored data can be used in order to improve the predictive models.

An exemplary CAS 200 can be divided into two sections, a network interface section and a content adaptation section. The network interface section may comprise an HTTP proxy 210, a page request module (PRM) 220, an active surfer table (AST) 215 and a markup language file handler (MLFH) 230. The content adaptation section may include one or more page data collectors (PDC) 240, one or more page object selection modules (POSM) 250, and a management and prediction module (MPM) 260. Data communication between the internal modules of CAS 200 may be implemented by using components such as, but not limited to, shared memory, buses, switches, and other components commonly known in the art that are not necessarily depicted in the drawings.

An exemplary ICS 140 (FIG. 1), in addition to common elements of a typical web server, may comprise elements which are similar to the elements of CAS 200. For example, SIU 143 (FIG. 1) may comprise elements having functionality similar to an HTTP proxy 210, a PRM 220, an AST 215 and an MLFH 230. An exemplary CAM 146 (FIG. 1) may comprise elements that are similar to those of a PDC 240, a POSM 250, and an MPM 260. Therefore, the operation of an exemplary ICS 140 may be learned by one skilled in the art from the detailed description of a CAS 154 and, to avoid unnecessary redundancy, will not be specifically described herein.

In exemplary embodiments of the present invention, in which the communication over network 120 is based on IP, HTTP proxy 210 may be adapted to handle the first four layers of the OSI (open system interconnection) seven layer communication stack. The layers may be the Physical Layer, Data Link Layer, Network Layer, and the Transport Layer (the TCP stack). In exemplary embodiments of the present invention, in which the CAS 200 is transparent to the ST 110 (FIG. 1) as well as to the content servers 152 (FIG. 1), the HTTP proxy 210 may behave as a transparent proxy and may use a redirector. The transparent HTTP proxy 210 may be adapted to collect packets traveling from/to the plurality of ST 110 (FIG. 1) and to/from the plurality of the content servers 152 of the domain 150. The header of the packets may be processed in order to determine how to route the received packets. HTTP requests for web pages may be routed toward PRM 220 and responses that include web pages in the form of a markup language file may be routed toward MLFH 230. Other packet types may be transferred toward their destination in an "as is" form.

Data coming from the internal module of CAS 200 is transferred via HTTP proxy 210 toward their destination. For example, HTTP requests for web pages, after being processed by PRM 220, are transferred toward the appropriate content server 152 (FIG. 1). HTML files, after being handled by MLFH 230, are transferred toward the appropriate ST 110 via HTTP proxy 210 to network 120.

Exemplary PRM 220 may comprise a bank of domain counters 222, a cookie decompression and update module (CDUM) 224 and a timer 226. PRM 220 may receive, from HTTP proxy 210, requests for web pages that are targeted toward content servers 152 (FIG. 1). The requests are processed in order to collect information that may be used for preparing predictive models, monitoring the predictive models, or retrieving predictive factors to be placed in a predictive model. After processing the request, the processed request is transferred toward the content servers 152 via HTTP proxy 210. The collected information may be written in an entry of AST 215 that is associated with the requester of the web page.

The collected information may include associated information such as, but not limited to, the day and the time the request for the web page was received, the IP address or IP port from which the request was sent, the type and the version of the browser application used for requesting the web page, and the URL used by a surfer for requesting the web page with the parameters that are attached to the URL.

In addition, the retrieved information may include behavioral information. The behavioral information may be statistical information that is managed by CAS 200. It may be divided into a requester's related behavioral information and a domain's related information. The requester's related behavioral information may include timers indicating one or more previous visits by the requester to the domain ACD 150 (FIG. 1), the last time that the requester requested a certain web page, the number of the requester's visits in the relevant ACD 150, etc. In some exemplary embodiments of the present invention, the requester's related behavioral information may include some attributes of the relevant surfer such as gender, age, income, etc. The requester's behavioral information may be retrieved from a cookie that is associated with the request.

The domain related behavioral information may include the number of requests for a certain web page from the domain and the time of the last request for this page, the number of times a certain offer (content object) was selected, the last time that it was selected, etc. Some of the exemplary counters may be time dependent such that the value of the counter may decrease over time. The domain related behavioral information may be counted and recorded in a plurality of domain counters 222 by PRM 220. In some exemplary embodiments of the present invention, behavioral information may be written within a cookie that is related to ACD 150 (FIG. 1).

The counters may be incremented by PRM 220 each time a request for an event that is related to the counter is identified by PRM 220. Incrementing the value of a counter may be time dependent such that the last value may decrease according to the time difference between the last event and the current event. Then the decreased value is incremented by one and the time of the current event is recorded. Fading the value of the counters may be done by using an exponential formula using a half-life-time constant, for example. The half-life-time constant may have a configurable value or an adaptive one. It should be understood that the fading algorithm described above is offered herein for exemplary purposes only and should not be interpreted to limit the present scope. Those skilled in the art with appreciate that other exemplary embodiments of the present invention may use other fading algorithms for adjustment of a counter.

PRM 220 may retrieve an associated cookie from the request, if one exists. In one exemplary embodiment, in which the cookie is compressed, the cookie is transferred to CDUM 224. Those skilled in the art will appreciate that different methods may be used for compressing/decompressing information written in a cookie. An exemplary compression method may express the values of the counters using a subset of ASCII based characters in lieu of decimal based characters. Other embodiments may express the counters by using logarithmic numbers (integer and mantissa), for example. Still other embodiments may use the combination of the two.

The decompressed cookie is parsed to identify a requester's ID wherein a requester's ID is an ID number that has been allocated to the requester by PRM 220. An exemplary ID may be defined randomly from a large number of alternatives. It may be a 32 bit or 64 bit number. If a requester's ID exists, then the AST 215 is searched for a section in AST 215 that is associated with the requester's ID. If a section exists, then a new entry is allocated in the relevant section of AST 215 for recording the associated and behavioral information that is relevant to the requester's request. If a section in AST 215 was not found, a new ID may be allocated for the given requester. In some exemplary embodiments of the present invention, a field in the cookie may point to a file stored at the server that includes behavioral information associated with a surfer.

If a requester's ID was not found in the cookie, a new requester's ID may be allocated to the requester. To do so, a new section in AST 215 may be allocated by PRM 210 to be associated with the new requester's ID and a new entry in the section allocated for storage of the information that is related to the current request for a web page.

Timer 226 may be used while managing behavioral information of a user. It may be used for timing indication on previous activities such as previous visiting, previous purchasing, etc. Further, the value of timer 226 may be used in the process of time fading of the counters. The clock of timer 226 may range from a few seconds to a few minutes, for example. Timer 226 may be a cyclic counter having a cycle of six months, for example.

Exemplary AST 215 may be a table, which is stored in a random access memory (RAM), for example. AST 215 may be divided into a plurality of sections such that each section is associated with a requester's ID and represents an active surfer. Further, each section may include a plurality of entries. Each entry may be associated with a request of a surfer from the web site ACD 150 (FIG. 1). Each entry may have a plurality of fields for storing information that may be used in the prediction process.

Each entry may include fields such as, but not limited to, the receipt time of the relevant request or associated information retrieved from the relevant request. Exemplary associated information may be such as, but not limited to, the type and the version of the browser application used for requesting the web page or the URL used by a surfer for requesting the web page along with the parameters that are attached to the URL.

In some embodiments of the present invention, some the URLs may include content grouping information such as, but not limited to, attributes of the content objects. Exemplary attributes may be the cost of a product, the brand of a product, vacation information, etc.

Other fields in an entry of AST 215 may store updated requester related behavioral information. Still other fields may store domain related behavioral information that was valid when the previous web page was sent from the domain to the requester. Yet another group of fields may store management information that is related to the operation of CAS 200 and indicate whether the current section is associated with a control surfer or a common surfer, for example. A common surfer may be a surfer for whom the object was presented as a result of using the object's prediction module. A control surfer may be a surfer for whom the object was selected randomly to be presented.

New sections and new entries in AST 215 are allocated by PRM 210. Different modules of CAS 200 may read and write information from/to the AST 215, as disclosed below relative to the description of the other modules of CAS 200. Once every configurable period, AST 215 may be scanned by MPM 260 looking for one or more inactive sections of AST 215. Exemplary periods may range from a few seconds to a few minutes. An inactive section is a section that the time period between the last received request (the time associated with the last entry of the section) is longer than a certain configurable value. Entries of inactive sections of AST 215 may be released after any stored data is copied to the appropriate PDC 240.

After allocating an entry for the current request in the appropriate section of AST 215, PRM 210 may write the retrieved associated information in the appropriate fields of the entry. A requester's related behavioral information may be retrieved from the decompressed cookie. The appropriate counters of the requester's retrieved related behavioral information may be updated. The received value of the appropriate counters may be manipulated to include the time affect of the period from the last visit (i.e., the fading affect). The time adapted value may be incremented by one, counting the current visit. The updated value may be stored in the relevant field of the entry.

PRM 210 may determine whether a requester that was assigned a new ID value can be designated as either a "control" or "common" requester. The decision may be based on configurable parameters, which may depend on the mode of operation of CAS 200, such as, for example, whether CAS 200 is operating in a "learning" mode or an "ongoing" mode. The decision on how to label the requester may be written in the appropriate field in the associated entry or section.

In the case that the requester has a valid ID, the URL associated with the request is parsed in order to determine which web page was previously delivered to the requester. The determination of the previously delivered web page may indicate the stimulus that prompted the user to make the current request. Once determined, the requester's section in AST 215 is searched for an entry that is associated with a previously delivered page (PDP). If such an entry is found, then an indication of "success" is written in association with the combination of the requested object and the link design (i.e., slot or redirection button). The success indication may be marked in a response field that is associated with the combination object and slot of the entry that includes the PDP that prompted the current requested object. While processing the information that is stored in the AST, object and slot combinations that do not have a success indication may be marked as "failures."

After processing the request, PRM 210 may replace the cookie, or write a new cookie if the request does not already include a cookie, with updated behavioral information. Subsequently, the request with the new cookie may be transferred to one of the content servers 152 (FIG. 1) via HTTP proxy 210. More information on the operation of PRM 210 is disclosed below in conjunction with FIG. 4.

An exemplary MLFH 230 may comprise a cookie update and compression module (CCM) 232. MLFH 220 receives, via HTTP proxy 210, markup language (ML) files such as HTML files, for example, that represent the requested web pages sent from content servers 152 toward ST 110 (FIG. 1). Each received ML file is parsed and the requester's ID retrieved. In addition, the web page ID may be defined. Based on the requester's ID, the relevant entry in the requester section of AST 215 is retrieved and parsed and the requester's assigned type ("control" or "common") is determined.

For a "control" requester, based on the web page ID, MLFH 230 may randomly configure the received ML file. The configuration may include the set of links (i.e., slots or redirection buttons) in the web page and an assigned object for each one of the links in the set. The assigned object may be selected randomly from a group of objects that may be presented on the requested web page, as determined by ID of the web page. In the case that the requester is not a "control" requester, the location of the entry in AST 215 that is relevant to the current page is transferred to one of the POSM 250 associated with the page ID of the current received ML file. In response, POSM 250 may initiate a selection process for determining the predicted configuration (object and slot) of the received ML file. As an example, the predicted configuration may be the configuration which maximizes the predicted expected value obtained by presenting the particular configuration.

When MLFH 230 has a defined configuration (randomly selected or predicted), it may manipulate the received ML file in order to include the configuration. Per each set (object and slot), the URL of the selected object may be assigned to the relevant link (slot) in the ML file. In addition, the entry in AST 215 may be updated to include the configuration of the page. Fields of the relevant entry in AST 215 that need to be included in an updated cookie, such as, but not limited to requester ID, updated page ID counters, and timers, are retrieved from AST 215 by MLFH 230. Identified fields are compressed by CCM 232, according to one of the compression methodologies previously anticipated. The compressed cookie is added to the header of the modified ML file. The modified ML file with the new cookie may then be transferred toward one of ST 110 (FIG. 1) via HTTP proxy 210. More information on the operation of MLFH 230 is disclosed below in conjunction with FIG. 6.

Each PDC 240 is associated with a web page that is stored in one of the content servers 152 (FIG. 1) and includes one or more links (slots) as well as a group or set of optional objects that may be assigned to those slots. Exemplary PDC 240 stores and manage the sampled data that is needed for calculating predictive models for objects that are associated with the given web page. An exemplary PDC 240 may comprise an event logger (ELOG) 242, an observation manager module (OMM) 246, and/or an objects historical database (OHDB) 248 that may include a plurality of database couples **249*as* & *af* to 249*ns* & *nf*. Each couple is associated with an object (objects a-n that may be assigned to the page). Each couple of databases, one database, 249*af* for example, stores records of events in which a link to the relevant object appeared in a delivered web page but the object was not selected. The second DB 249*as*** stores records of events in which the relevant object was selected, for example.

From time to time, one or more entries of an inactive section may be retrieved from AST 215 by MPM 260. These entries may be sorted according to the web pages that are associated with the entry and copied to ELOG 242 of the relevant PDC 240. Wherein each PDC 240 is associated with one web page of the one or more web pages, each one of these entries, in AST 215, may be transferred as a record into ELOG 242 and the inactive entries released from AST 215.

OMM 246 manages the stored records that are related to its associated web page. In order to reduce the cost and the complexity of the PDC 240 storage volume, the storage volume may be divided into two types, short term (ELOG 242) and long term (the bank of databases OHDB 248). Periodically, once in a configurable transfer period (TP), an hour for example, the records in the ELOG 248 may be copied into appropriate ODB 249 and then released.

In one embodiment of PDC 240, OHDB 248 is managed in a cyclic mode. The volume of each ODB 249 is divided into a plurality of sub-ODB. Each sub-ODB is associated with a transfer period. A transfer period, for example, may be the time interval between transferring the data of ELOG 242 to OHDB 248 and the number of sub-ODB may be a configurable number that depends on the volume of each ODB 249 and the number of records for sub-ODB that are needed. The number of records in sub-OBD may vary according to the mode of operation, i.e. "learning" or "ongoing" mode, for example.

It is conceivable that the number of records copied from ELOG to a sub-ODB may be larger than the size of the sub-ODB. In such a scenario, dropping of records may be required. It is anticipated that in order to keep the integrity of the sampled data when record dropping is required, the ratio between the number of success-records that are copied to ODB 249*s* and the number of fail-records (not having a success indication) that are copied into ODB 249*f* must be taken into consideration. More information on the operation of PDC 240 is disclosed below in conjunction with FIG. 5.

Each POSM 250 is associated with a web page that is stored in one of the content servers 152 (FIG. 1) and includes one or more links (slots) and a group of optional objects that may be assigned to those slots. In an exemplary embodiment of the present invention, POSM 250 may receive, from MLFH 230, a pointer to an entry in AST 215 that is associated with a markup language file (HTML, for example) currently processed by MLFH 230. After processing the information that is retrieved from the relevant entry in AST 215, POSM 250 may deliver a predictive configuration, which is a set of pairs, each pair comprised of a slot and an object, to be embedded in the markup language file that is currently handled. An exemplary POSM 250 may comprise a predictive factors buffer (PFB) 253, an object selecting processor (OSP) 255 and a bank of current predictive models that includes a plurality of object's predictive model (OPM) 257*a* to 257*k*. Each OPM 257 is associated with an object that may be presented on the currently processed HTML file.

A plurality of predictive factors may be retrieved by OSP 255 from the relevant entry in AST 215 and stored in PFB 253. Different methods may be used for determining which configuration of a delivered web page maximizes the expected predicted value obtained by presenting the configuration. In one exemplary method for defining the predictive configuration, each one of the OPM 257*a-k* may be processed either singularly or in parallel. Per each OPM 257*a-k*, one or more relevant predictive factors are copied from PFB 253 into the relevant location in OPM 257 and the predictive value of the object, as well as the predictive value of the configuration (set of objects and slots), is calculated and written in a table of prediction values. After calculating the predictive value of a first object and the recommended configuration of the page in view of the first object, OSP 255 may repeat the process for the remaining one or more objects.

After calculating the predictive values and the configuration per each object, OSP 255 may scan the table of prediction values in order to determine which web page configuration (set of slots and objects) without conflicts has the highest probability of being selected by a surfer. The identified configuration may be stored in the relevant entry of AST 215 and indication that a selection was made may be sent to MLFH 230.

An alternative embodiment of OSP may use another method, such as exhausting search, for defining the predictive configuration for the requested web page. In such an embodiment, the table of prediction values may include an entry per each possible configuration (permutation) of the web page. Each entry in the table conceivable may have a plurality of fields wherein each field may be associated with an optional slot. Per each cell (a junction between a row and a column in the table), the OPM 257 of the object that is associated with the slot may be fetched and calculated in view of the other configuration pairs of the web page. The predictive value of the configuration of the web page may be calculated as the average of the predictive value of each cell in the row such that the configuration with the highest value may be selected as the predictive configuration. More information on the operation of POSM 250 is disclosed below in conjunction with FIG. 7.

MPM 260 manages the operation of CAS 200. It may comprise a prediction model builder (PMB) 262, a manager module 264 and a predictive model monitoring module (PMM) 266. Exemplary manager 264 may communicate with the administrator of ACD 150 (FIG. 1) in order to collect information on the various web pages such as, but not limited to, which optional objects may be associated with a web page, which slots the optional objects may be assigned, the value of each object to the owner of the content server, the time of the day in which an object may be presented, etc.

Among other tasks, manager module 264 may define the operation mode of CAS 200. It may determine whether to work in a learning (training) mode or in ongoing mode, for example. Further, it may get monitoring reports from PMM 266 and generate a decision as to whether the current predictive models are valid, need tuning or need replacing. Manager module 264 may further communicate with the administrator of ACD 150 (FIG. 1) in order to deliver reports or gather information on new pages, expired pages, etc.

On a configurable schedule, manager module 264 may be adapted to scan the AST 215 and identify any inactive sections. An exemplary scanning period may be in the range of few minutes to a few hours. An inactive section is a section that the time period between the last received request (the time associated with the last entry of the section) and the scanning time is longer than a certain configurable value. Manger module 264 may sort the entries of each inactive section according to their associated web page. Each identified entry in the inactive section may be copied into the ELOG 242 that is associated with the PDC 240 and assigned to the specific web page. After the data of the inactive entries of AST 215 has been copied, the inactive entries may be released. More information on the operation of Manager module 264 is disclosed below in conjunction with FIG. 3A & 3B.

An exemplary PMB 262 may be operable to create a plurality of predictive models wherein each predictive model may be associated with an object that may be presented in a certain web page. A predictive model may include one or more predictive formulas. In order to calculate a predictive formula, an exemplary PMB 262 may use a known predictive algorithm such as, but not limited to, logistic regression, linear regression, decision tree analysis, etc. Further, some exemplary embodiments of PMB 262 may use stepwise methods while calculating the predictive formula. An exemplary predictive model may include one or more predictive factors wherein each set of values of the predictive factor may be associated with a coefficient in a predictive formula. Exemplary value sets may be a list of values or a range values. The coefficient may represent the effect of a predictive factor on the prediction that the relevant content object will be selected by a surfer. Exemplary predictive factors may be such as, but not limited to, the day in the week, the hour, the browser type, the number of visits to the site, the content object that is presented in another selecting button in the same web page, the time from the last visit, a surfer's attribute, a content object attribute, etc.

PMB 262 may use one or more sets of properties which can be used during the preparation of the predictive model. Each set of properties may be composed of a set of parameters that can be used while preparing a prediction model. An exemplary parameter may be an "aging" parameter that assigns a weight to an entry based on its age. Other parameters may define the minimum number of appearances required for a predictive factor to be considered relevant. Another parameter may define the minimum predictive score value required for a predictive model to be processed further.

The process of preparing an object's prediction model may include organizing the raw data from success and fail ODB 249 into an object's table. Each entry from the ODBs 249Ns & 249Nf is copied into a row (record) in the object's table. The rows are sorted by time, regardless of success indication. Each column in the object's table may be associated with a parameter of the record, which is stored in the row. Exemplary columns may be the weight of the record (the weight may reflect the decreased value of the ODB from which the record was copied), the result, success or failure designation, or various predictive factors that are stored in the relevant record. Exemplary predictive factors may include relevant URL keys that were embedded within the associated information that was stored in the record wherein some of the URL keys may include attributes of the requested web page such as behavioral information values In some embodiments, the cookie may include one or more attributes of a surfer and those attributes may be associated with certain columns in the object's table. The object's table may be divided into a validation table and a training table. The training table may be referred as an analyzing table.

After organizing the object's table, a bin creating process may be initiated. A bin may be a set of values of a certain predictive factor that differs from the other sets by a certain variance in prediction efficiency. When the predictive factor is nominally scaled, then a bin may be a list of names. When the predictive factor is ordinarily scaled, then the set of values may be an interval of values. The certain variance may be a parameter in the set of properties. The overall prediction efficiency of a bin may be calculated as the percentage of success compare to the total number of records in the training table that belong to the same set (the same bin), while taking into account the weight of the records when the bin is true and when the bin is false.

An exemplary bin may be the time interval between 8:00 am to 2:00 pm, for example. A bin table is created based on the training table by dividing each column of the training table into one or more bins (each bin represented by a column in the bin table). Each cell in the bin's table may represent a true or false value. The value may be "true" if the value in the relevant cell in the training table is in the bin's interval and false if the value in the relevant cell in the training table is not in the bin's interval.

In addition, a legend may be associated with the bin's table. The legend may define the predictive factor from which the bin was processed, the interval that the bin includes and the predictive efficiency of the bin. The process of creating a bin's table is repeated per each set of properties.

The bin's table and its legend may be loaded into a predictive. The calculated predictive model that was created based on the first set of properties is stored. PMB 262 may repeat the steps of creating a second bin's table and a second predictive model based on the second set of properties. The second predictive model may be stored as well and PMB 262 may continue the process for the remaining property sets.

When a set of predictive models is calculated, one per each set of properties, each one of the predictive models is applied to the records of the validation table. The results of the predictions are compared with the actual recorded responses of surfers and a prediction score is granted to the predictive model. An exemplary prediction score may be the percentage of the successful predictions, when compared to the actual recorded responses, out of the total records in the validation table. The group of calculated predictive models, one per each set of properties, may be sorted according to the respective prediction scores. The models having a score below a predetermined minimum (one of the parameters in a set of properties) may be ignored. Then an object prediction model is calculated as a weighted average of the predictive models having prediction scores above the predetermined minimum.

In order to reduce the number of ignored prediction models, another exemplary PMB 262 may further process the comparison between the prediction results of the different models in order to adjust the associated property sets. For example, if one or more predictive models have a prediction score below the limit and use property sets in which the half-life time constant has a large value, the value may be adjusted to a smaller one.

PMB 262 may repeat the above described process for each one of the possible objects in a certain web page and then it may repeat this process for each web page. In an alternate embodiment of the present invention, MPM 260 may comprise a plurality of PMB 262. Each PMB 262 may be associated with a web page, for example. More information on the operation of PMB 262 is disclosed below in conjunction with FIG. 9A & 9B.

An exemplary PMM 266 monitors the plurality of predictive models wherein each predictive model may be associated with an object that can be presented in a certain web page. PMM 266 may be adapted to monitor the performance of each one of the object's prediction models that are currently used by CAS 200. Per each web page, an exemplary PMM 266 may periodically monitor the ELOG 242 of the PDC 240 that is assigned to the current monitored web page. The period between consecutive monitoring may be a configurable period that depends on the mode of operation of CAS 200. In "learning" mode (training mode), the configurable time period, Tmt, may range from a few minutes to tens of minutes. During "ongoing" mode, the configurable period, Tmo, may be tens of minutes to a few hours, for example.

Per each object that may be associated with the web page, PMM 266 may scan the records in ELOG 242 looking for records in which a delivered web page presents the relevant object to be selected by a surfer. Each found record may be subsequently parsed in order to determine whether the record was executed by a "common" surfer (a surfer for whom the object was presented as a result of using the object's prediction module) or a "control" surfer (a surfer for whom the object was selected randomly to be presented). The record may be further parsed in order to determine the response of a surfer, whether the object was selected by a surfer (success) or not (failure). At the end of the process, PMM 266 may calculate two probability values per each object's prediction model, i.e. the probability of success of a "common" surfer and/or the probability of success of a "control" surfer. The two probability values per each object's prediction model in the web page may be written in a web page comparison table. The web page comparison table may be transferred to the manager module 264 and/or PMB 262. After processing the records stored in ELOG 242, an indication may be sent to OMM 246 of the same PDC 240 informing the OMM 246 that it may initiate the process of transferring the information from ELOG 242 to OHDB 248.

At this point, PMM 266 may repeat the process for the next web page and continue in a loop. In an alternate embodiment of the present invention, MPM 260 may comprise a plurality of PMM 266 wherein each PMM 266 may be assigned to a web page. More information on the operation of PMM 266 is disclosed below in conjunction with FIG. 8.

Figure 3A:
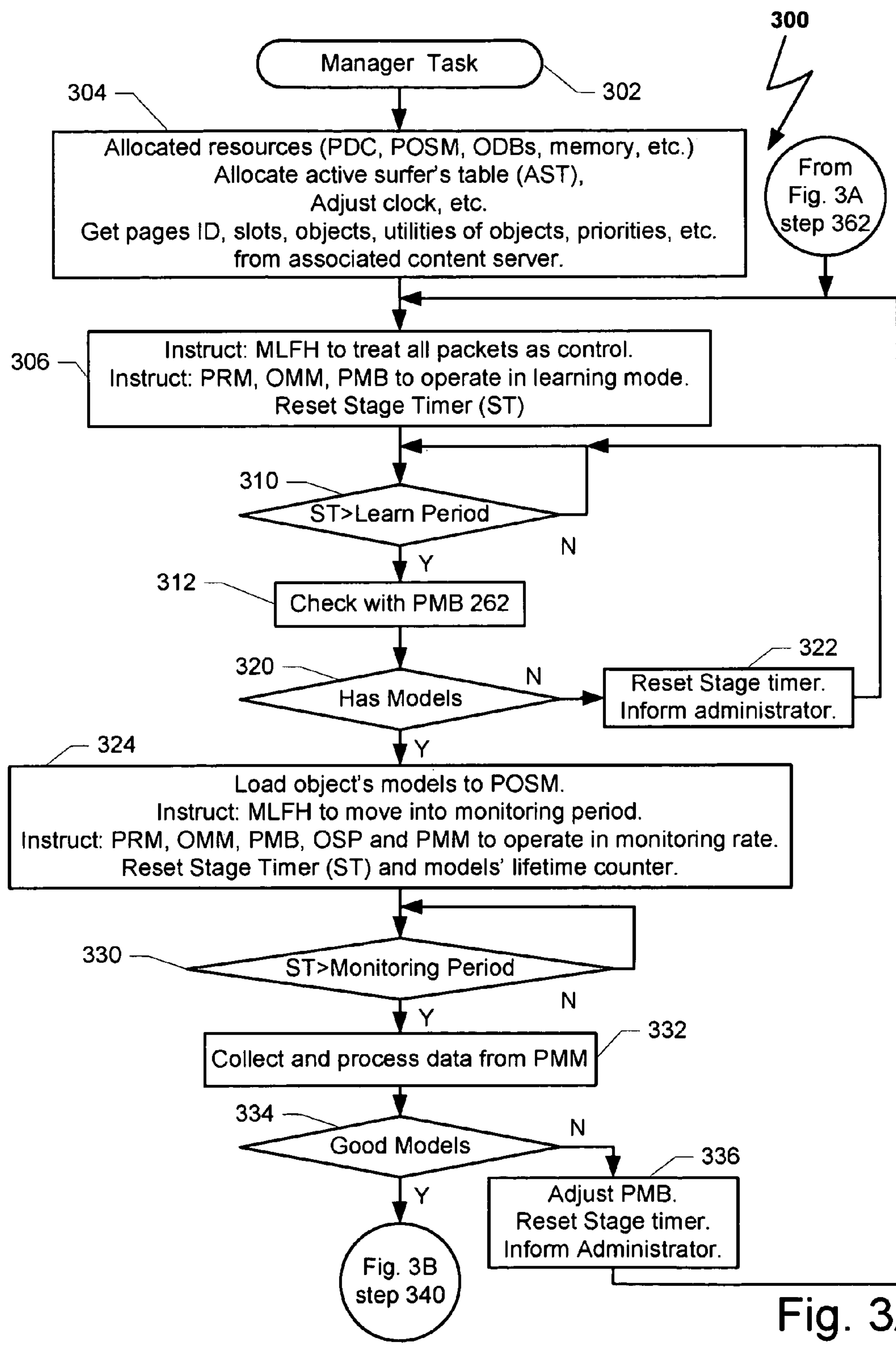
FIGS. 3A & 3B schematically illustrate a flowchart showing relevant processes of an exemplary embodiment of a management method.
Figure 3B:
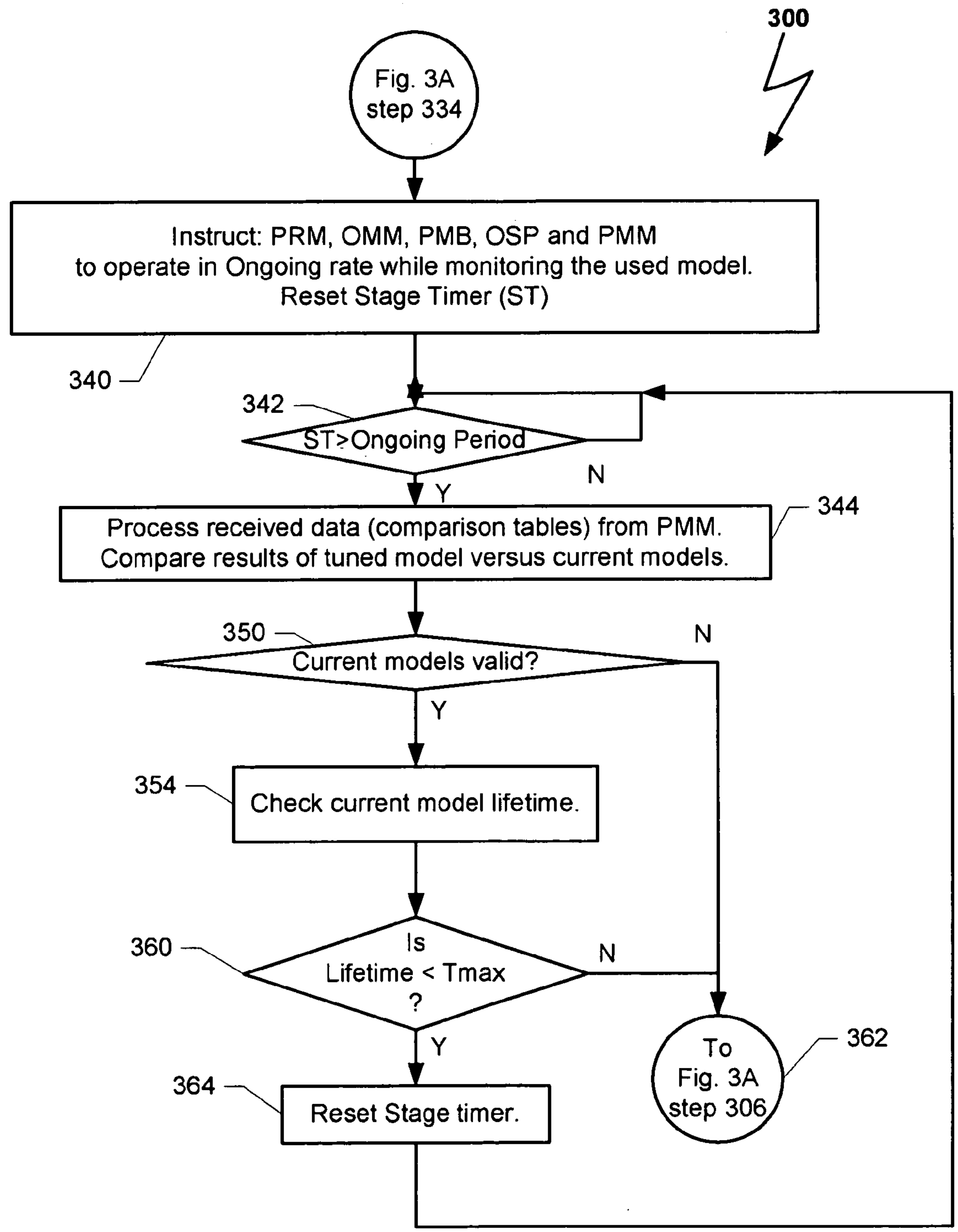

FIG. 3A & 3B depict a flowchart illustrating relevant processes of an exemplary method 300 used by some embodiments of the present invention for managing the operation of CAS 200 (FIG. 2). Method 300 may be implemented within the manager module 264 (FIG. 2), for example. Method 300 may be initialized 302 after upon "power on" status and may run in a loop as long as the CAS 200 is active. During the initialization process 302 & 304, the manager 264 may be loaded with configurable information such as information on relevant resources that stand for the internal modules of CAS 200. Accordingly, the manager 264 may allocate resources to the other modules such as PRM 220, PDC 240, POSM 250, etc. The AST 215 (FIG. 2) may be created and introduced to the appropriate modules. The clock of CAS 200 may be adjusted. Further, the clock may use a proprietary format. For example, the clock may count minutes in continuous mode from 00:00 of the first day of January until 23:59 of December 31. In alternate embodiments, the clock may be reset every six months, etc.

After setting the internal models, the manager 264 may get updated information from the content servers 152 and/or the administrator of ACD 150 (FIG. 1) such as, but not limited to, information related to a web page, optional objects that may be presented, optional slots (redirection buttons or links), priorities and the value of each object, etc.

At the end of the initiation process, MLFH 230 (FIG. 2) may be instructed 306 to treat all responses (ML files) as if each was associated with a "control" surfer. In response, MLFH 230 may randomly select objects to be placed and presented in a requested web page. Other modules such as PRM 220, OMM 246 and PMM 266 (FIG. 2) may be instructed to work in a "learning" or "training" mode. During the learning mode, PRM 220 may mark all surfers as "control" surfers. Further, OMM 246 and PMM 266 may operate at higher rates than when the embodiment is in "ongoing" mode. Stage timer (ST) is resetand used to define the time limit of the current mode of operation.

At such point, method 300 may wait 310 until the value of ST reaches a configurable value predefined to correspond to the "Learning Period". The "Learning Period" may be in the range of few tens of minutes to a few days, depending on the volume of requests sent toward ACD 150 (FIG. 1), for example. If 310 the ST reached the value of the "Learning Period," then PMB 262 (FIG. 2) may be checked 312 in order to determine if 320 it was successful in preparing a set of predictive models for objects. If the set is not ready, method 300 may inform 322 an administrator of ACD 150 (FIG. 1) about the number of cycles of the "Learning Period" that were completed without success. In such a case, ST may be reset and method 300 looped to step 310.

If 320 a set of object's predictive models is ready, then the set is loaded 324 into POSM 250. Other internal modules such as PRM 220, MLFH 230, OMM 246, PMB 262, OSP 255 and PMM 266 (FIG. 2) may be instructed to change mode into a "monitoring" mode (period). The monitoring mode is used for tracking the individual predictive models. During the monitoring mode, PRM 220 designates a certain percentage (a configurable number in the range of 5% to 50%, for example) of surfers as "control" surfers. PMM 266 may compare the probability of success of control surfers to the probability of success of the common surfers and create a set of comparison tables, one per each object's predictive model. The comparison tables may be used by manager 264 (FIG. 2) in order to determine the performance of each set of object's predictive models.

In an alternate embodiment of the present invention, the monitoring mode may be implemented on a page level and not on an object level. In such an embodiment, the two counters, ST and a model's lifetime counter, are reset. The model's lifetime counter may be used for defining the overall time limit or maximum age of the predictive models. A typical, and exemplary, maximum age may be 24 hours, for example.

Then method 300 waits 330 until the value of ST reaches a configurable value predetermined to define the "Monitor Period." The "Monitor Period" may be in the range of few tens of minutes to a few hours, depending on the volume of requests which were sent toward ACD 150 (FIG. 1), for example. If 330 the ST reached the value of the "Monitor Period," then PMM 266 (FIG. 2) may be requested to deliver a set of web page comparison tables, one per each web page 332. A web page comparison table may comprise the two probability values per each object's prediction model that may be assigned to a given web page. The two probability values may represent the probability of success of a common surfer and the probability of success of a control surfer.

In some embodiments of the present invention, in which the monitoring mode is implemented at a page level, the probability values may be calculated at such level. In such an embodiment, a success of a page may be defined as responding to one of the presented objects. In some cases, each observation may be weighed by the percentage of the utility value of the selected object from the utility value of the page itself. The manager module 264 (FIG. 2) may process the results from the table and compare them to a predefined set of values that are stipulated by the administrator of ACD 150 (FIG. 1). If 334 the results of the predictive models are better than the required values, then method 300 proceeds to step 340 in FIG. 3B. If 334, in the alternative, the results are below the stipulated performance threshold, then PMB 262 (FIG. 2) may be adjusted 336 accordingly. The set of properties which were used for calculating the predictive model may be adjusted, for example. In addition, an indication may be sent to the administrator and method 300 may return to step 306.

FIG. 3B depicts the ongoing operation mode of method 300. At step 340, PRM 220, MLFH 230, OMM 246, PMB 262, OSP 255 and PMM 266 (FIG. 2) may be instructed to change mode into an ongoing mode while the performance of the loaded sets of object's predictive models, one set per each web page, is monitored and ST is reset. During the ongoing mode, PRM 220 designates a small percentage of surfers as control surfers. PMM 266 may compare the probability of success of control surfers to the probability of success of common surfers and create a set of comparison tables, one per each object's predictive model. The comparison tables may be used by manager 264 (FIG. 2) for determining the performance of the sets of the object's predictive models.

Method 300 may wait 342 until the value of ST reaches a configurable value predefined to correlate with the "Ongoing Period." The "Ongoing Period" may be in the range of a few tens of minutes to a few days, depending on the volume of requests which were sent toward ACD 150 (FIG. 1), for example. When 342 the ST reaches the value of the "Ongoing Period," then PMM 266 (FIG. 2) may be requested to deliver a set of web page comparison tables, one per each web page. The manager module 264 (FIG. 2) may subsequently process the results in the table and compare them to a predefined set of values that are stipulated by the administrator of ACD 150 (FIG. 1) 344. If 350 the results of the predictive models exceed the required values, then the predictive models may be considered as valid and method 300 proceeds to step 354. If 350 the results are below the required performance, then the predictive models may be considered as not valid and method 300 returns 362 to step 306 (FIG. 3*a*) for calculating new sets of object's predictive models.

At step 354, the value of the model's lifetime counter is checked and a determination is made 360 as to whether the value is below a configurable value Tmax. Exemplary Tmax may be a few hours to a few days, for example. If 360 the value is below Tmax, which would indicate that the sets of object's predictive models are still valid, then the ST counter may be reset 364 and method 300 returned to step 342. If the value of the lifetime counter is above Tmax, then method 300 may proceed to step 362 and returned to step 306 (FIG. 3*a*) to initiate calculation of a new set of predictive models.

Figure 4:
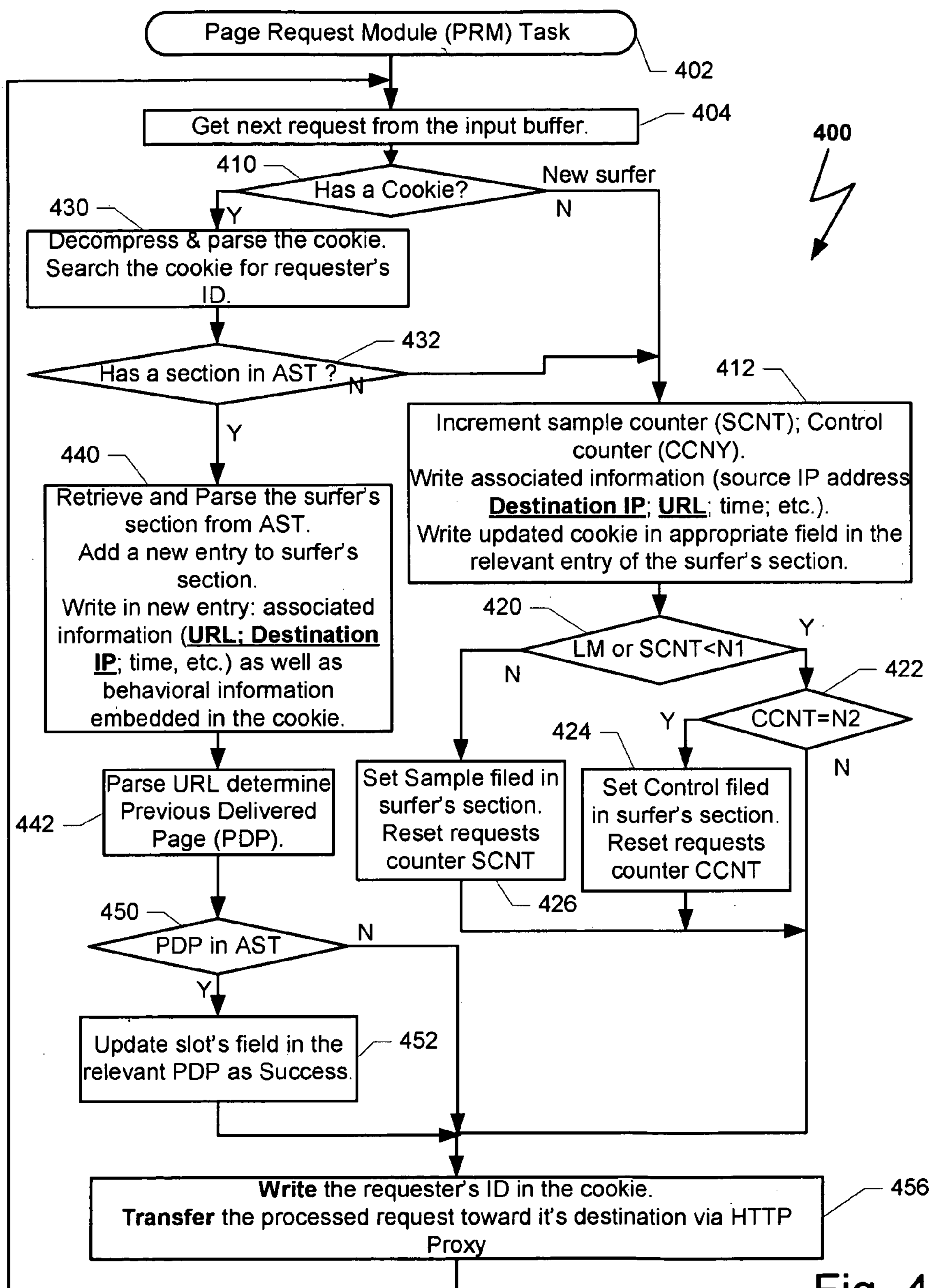
FIG. 4 schematically illustrates a flowchart showing relevant processes of an exemplary embodiment of a method for handling a request for a web page.

FIG. 4 illustrates a flowchart with relevant processes of an exemplary method 400 that may be used for handling surfer's requests that are sent toward content servers 152 (FIG. 1). Method 400 may be implemented within the PRM 220 (FIG. 2), for example, and initialized 402 by the manager module 264 during the "power on" process each time the manager determines to change the mode of operation of CAS 200 (learning, monitoring and ongoing). After initiation, method 400 may run in a loop as long as the mode is not changed. During the initialization process 402, PRM 220 may be loaded with information that is relevant for communicating with other internal modules of CAS 200, modules such as the manager 264 and AST 215 (FIG. 2). In addition, accessory counters that are used by PRM 220 may be initialized, counters such as a sample counter (SCNT) and control counter (CCNT). Two parameters, N1 and N2, are loaded according to the mode of operation. N1 may define a portion of sampled surfers (a sampled surfer is a surfer upon whose behavior the predictive models are based) out of the total number of surfers. N2 may define the portion of control surfers out of the total number of surfers. In addition, AST 215 may be initialized.

After the initiation stage, method 400 may start processing surfer's requests that are transferred via HTTP proxy 210 (FIG. 2) to a queue of PRM 220. The next request in the queue is fetched 404 and parsed in order to identify any attached cookie. If 410 the request does not include a cookie (a new surfer), an ID is allocated to the new surfer and method 400 proceeds to step 412 for handing the request of the new surfer. If 410 a cookie is found, exemplary embodiments of the present invention may decompress 430 and parse the cookie (assuming the cookie is compressed). In other exemplary embodiments, in which compression is not used, any identified cookie is just parsed without prior decompression. Once parsed, a cookie is searched for a requester ID and, according to the ID, the AST 215 (FIG. 2) is searched 432 for a section that is associated with the ID. If 432 a section in the active surfer table AST 215 (FIG. 2) was not found, then method 400 proceeds to step 412. If 432 a session in the active surfer table AST 215 (FIG. 2) was found, indicating that the request is associated with a current active surfer having at least one recent request served by CAS 200, then method 400 proceeds to step 440 and continues serving the active surfer.

At step 412, the first request of a new active surfer his handled. In the case that the mode of operation is one other than a learning mode, then the sampled counter (SCNT) and control counter (CCNT) are incremented by one. In the case that the current mode is a learning mode, the SCNT is disabled and a new section in AST 215 (FIG. 2) is allocated to the new active surfer. Subsequently, the new section in AST 215 is associated with the allocated requester's ID. In the new section, an entry is allocated for the current request. At this point, method 400 starts writing the information associated with the request to the appropriate fields of the allocated entry. The associated information may include, for example, the receipt time according to the clock of CAS 200, the URL which is associated with the request, the source IP and the destination IP of the request, etc. In some exemplary embodiments of the present invention, the URL may include one or more fields that reflect attributes of the requested webpage. Exemplary attributes may be the topic of the page (vacation, news, sports, etc.).

The decompressed cookie, if it exists, is updated or a new cookie may be written. The cookie may include behavioral information associated with the surfer such as the date and time of the surfer's last visit to the web page, the frequency of visits by the surfer to the web page, etc.

Other behavioral information may include one or more counters wherein each counter may count the number of events of a certain type. Exemplary counters may count the number of the active surfer's visits to the relevant website, the number of requests for a certain web page from the website, the number of times a certain offer (content object) was selected, etc. Updating the counters may be time dependent Such that the value of the counter may decrease over time, as previously described. In some embodiments, the cookie may include labels for a surfer's attributes. Exemplary attributes may be a surfer's age, gender, hobbies, etc. The updated information of the cookie is stored in the appropriate fields of the entry in AST 215.

After writing the appropriate information into the allocated entry in AST 215, a determination is made 420 as to whether the operating mode is a learning mode and\or whether SCNT value is smaller than N1. If 420 one or both of the determinations are found to be true, then method 400 proceeds to step 422. If 420 the operating mode is other than learning mode or SCNT value is equal to or greater than N1, then the sample field in the associated entry (in AST 215) is set as "true" 426 in order to indicate that the current active surfer is selected to be a sampled. A sampled surfer is a surfer upon whose behaviors the predictive models are based and whose decisions may be analyzed by PDC 240, PMM 266 and PMB 262 (FIG. 2), for example. Typically, an N1 value that is associated with the monitoring period is smaller than an N1 value that is associated with the ongoing mode. Consequently, the portion of the sampled surfers in the monitoring period is likely to be larger than the sampled portion during the ongoing mode. The value is a configurable value and may be in the range of a few hundred to a few tens of thousands of surfers depending on the traffic through CAS 200.

After setting the sampled field in the entry of AST 215, the SCNT is reset and method 400 proceeds to step 456 in which the requester ID is written in the cookie of the request and the request is transferred toward its destination (one of the servers 152 in FIG. 1) via the http proxy 210 (FIG. 2). Method 400 returns to step 404 for processing the next request.

If 420 the operating mode is a learning mode and\or SCNT is smaller than N1, then a determination is made 422 as to whether CCNT is equal to N2. If 422 yes, the control field in the associated entry is set 424 to indicate that the current active surfer is selected to be a control surfer. A control surfer is a surfer upon whose behavior the predictive models are not implemented, i.e. the objects to be presented to a control surfer are selected randomly. Later, a surfer's decisions are sampled and may be analyzed by PDC 240, PMM 266 and PMB 262 (FIG. 2), for example. The N2 value that is associated with a learning mode is set to 1 and, consequently, each surfer is designated as a control surfer.

In the monitoring period, the value of N2 is smaller than the value of N2 that is associated with the ongoing mode. Consequently, the portion of the control surfers in a monitoring period is larger than the control portion during the ongoing mode. The value of N2 is a configurable value and may be in the range of a few hundreds to a few tens of thousands of surfers depending on the traffic via CAS 200.

After setting the control field in the entry of AST 215, the CCNT is reset 424 and method 400 proceeds to step 456. In the case 422 that the CCNT is not equal to N2, than method 400 proceeds to step 456.

In an alternate exemplary embodiment of the present invention, defining a surfer as a sampled surfer may be executed after receiving a surfer's response. In such an embodiment, a surfer that responded positively may be defined as a sampled surfer and the SCNT may be reset. One of the reasons for using this sorting method is to increase the size of the positive samples, since the positive samples are less populated than non-responding surfers.

Returning now to step 432, if a section that is associated with the requester's ID exists, then a surfer's section in AST 215 (FIG. 2) is retrieved 440 and parsed. The requester's section in AST 215 is searched for an entry that is associated with a previously delivered page (PDP) that points to the current requested object. If such an entry is found, then a success indication is written in association with the requested object and redirection button (slot) combination. The success indication is marked in a response field associated with the combination of the specific object and slot of the entry that includes the PDP that prompted the current requested object. While processing the information that is stored in the AST, object and slot combinations that do not have a success indication may be referred to as failures. Next, a new entry in the section is allocated for storing information that is relevant to the current received request. The information associated with the request is written into the appropriate fields of the new entry. The decompressed cookie is updated written to the appropriate fields of the new entry, as disclosed above in conjunction with step 412. Notably, in some embodiments the cookie may include an indication of a surfer's attribute, while the URL may include an indication on attributes of the requested web page.

After writing the information in the new entry, the URL that is associated with the request is parsed 442 in order to determine whether the current request originated from a web page that was recently sent via CAS 200 as a response to a recently received request from the particular surfer. Presumably, such a web page included an object and slot combination which reflects the URL that is associated with the current received request. Therefore, the entries that belong to the same surfer's section, and are associated with recently received requests and delivered web pages, are parsed 442 looking for an entry in which the configuration of the web page reflects the associated URL. This entry may be associated with a previously delivered page (PDP) that was sent recently toward the surfer.

If 450 such an entry is found, then a success indication is written 452 in the result field that is associated with the object and slot combination of the URL associated with the current request. At such point, method 400 proceeds to step 456. If 450 a PDP is not found, method 400 proceeds to step 456.

Figure 5:
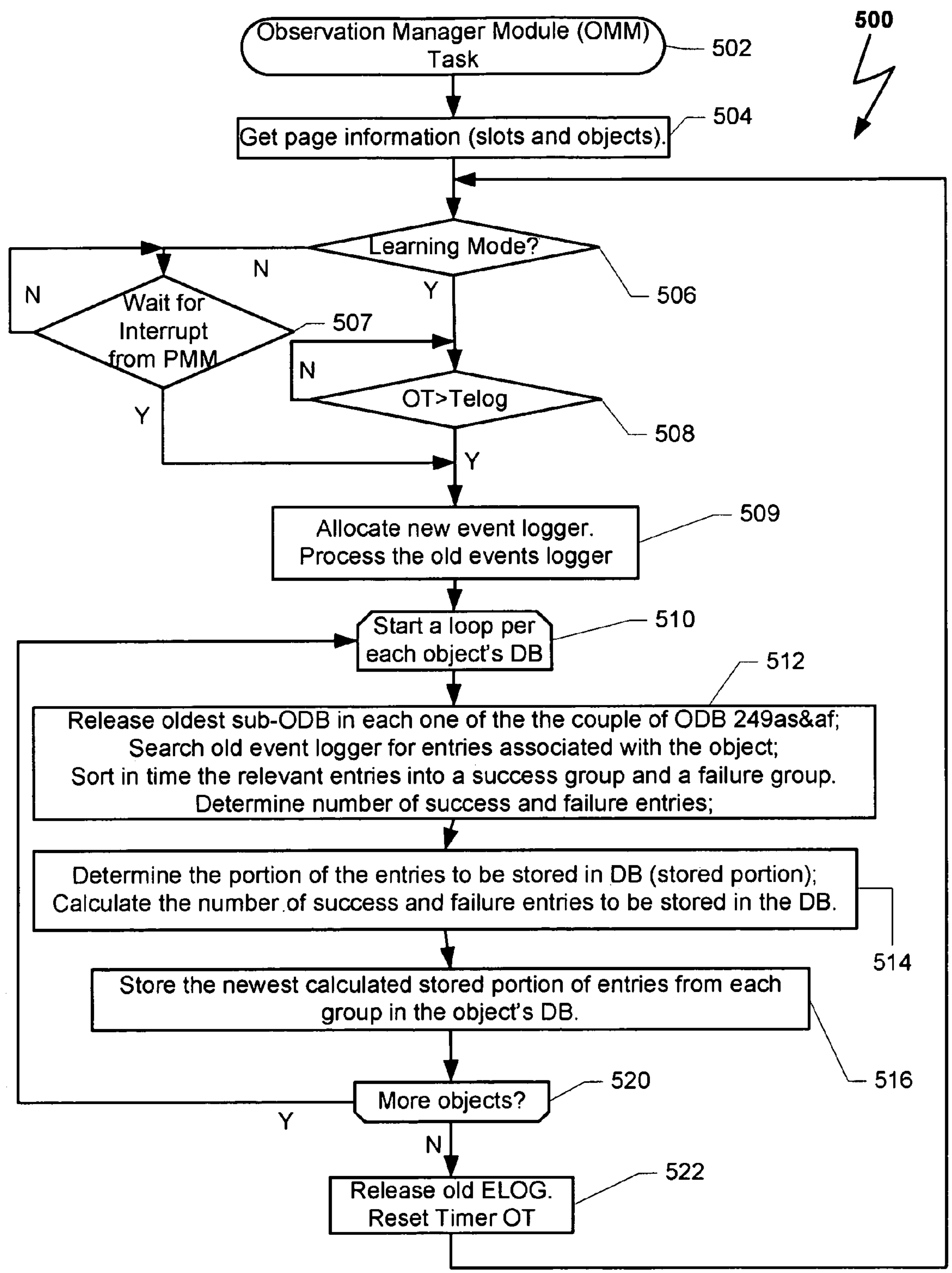
FIG. 5 schematically illustrates a flowchart showing relevant processes of an exemplary embodiment of a method for storing sampled data.

FIG. 5 illustrates a flowchart with relevant processes of an exemplary method 500 that may be used for managing a page data collector module (PDC) 240 (FIG. 2). Method 500 may be implemented within the OMM 246 (FIG. 2), for example. Method 500 may be initialized 502 by the manager module 264 (FIG. 2) during the "power on" process. After initialization, method 500 may run in a loop as long as CAS 200 is active. Method 500 may be used for transferring the stored data from ELOG 242 (FIG. 2) to OHDB 248 (FIG. 2) while keeping the integrity of the sampled data as a representative sample of a surfers' behavior.

During the initialization process 502 & 504, OMM 246 may be loaded with information that is relevant for communicating with other internal modules of CAS 200 such as the manager 264, PMM 266, ELOG 242, (FIG. 2) etc. In addition, information is retrieved from manger module 264 (FIG. 2). The retrieved information may be relevant to the web page, which is associated with the PDC 240 that includes the relevant OMM 246. The information may include the objects that may be associated with the web page and the slots in by which the objects may be presented. Timers, such as the OMM timer (OT), may be reset.

After the initiation process, a determination is made 506 as to whether the current operating mode is a learning mode (training mode). If not a learning mode, method 500 may wait 507 for an indication from PMM 266, in which PMM 266 may inform OMM 246 that the data, which is stored in the current ELOG 242, was inspected and that OMM 246 may start transferring the data from the ELOG 242 toward OHDB 248 (FIG. 2). When 507 an indication is received, method 500 may proceed to step 509. If 506 the operating mode is a learning mode, then method 500 may wait until OT is greater than Telog 508. Telog may be a configurable parameter in the range of a few tens of seconds to a few tens of minutes, for example. When OT is greater than Telog, method 500 proceeds to step 509.

At step 509 a new ELOG 242 is allocated 509 for storing the future events that are related to the relevant web page and method 500 begins processing and transferring the stored data from the old ELOG 242 into OHDB 248. A loop from step 510 to step 520 may be initiated and each cycle in the loop may be associated with an optional object that may be presented over the relevant web page.

At step 512, the oldest sub-ODB in each one of the ODB couples associated with the current object, object "a" for example which comprises the success ODB 249*as* and the failure ODB 249*af*, are released and a new sub-ODB is allocated for storing data that is transferred from the old ELOG 242 that is related to the current object. The old ELOG 242 (FIG. 2) is searched for entries that include the current object. The result field in each entry is parsed and the entries are divided into two groups, a success group (having a success indication) and a failure group (do not have a success indication). The entries in each group may be sorted by time such that the newest entry appears at the top of the group, for example, and the total number of each group calculated.

The portion of the entries from each group that may be stored in the appropriate new sub-ODB is calculated 514 by dividing the number of entries in each one of the appropriate new sub-ODB (success or failure) by the total number of entries in each group (success or failure, respectively). If at least one of the groups has a portion value smaller than one, meaning that some of the entries of the group will be dropped in lieu of being stored in the new sub-ODB, then the smallest portion value may be selected for determining the number of entries from each group (success or failure) that will be stored in the appropriate sub-ODB (success or failure, respectively).

The total number of entries in each group is multiplied by the smallest portion value for determining the numbers of entries (NE) from each group that will be stored in the appropriate new sub-ODB. NE entries from the top (the newest entries) of each group are copied 516 to the appropriate sub-ODB. If for both groups the portion values are greater than "one," then all the entries of each group (success or failure) may be copied to the appropriate new sub-ODB (success or failure, respectively). The portion value of the deletion per each group (success and failure) may be recorded in association with the success ODB 249*as-ns* and the failure ODB249*af-nf* (respectively). In some exemplary embodiments of the present invention, old entries in the success ODB 249*as-ns* and the failure ODB249*af-nf* may be released only when there is no free space available for storage of new observations.

After copying 516 the entries to the new sub-ODB, a determination is made 520 as to whether additional objects may be presented in the relevant web page. If yes, method 500 may start a new cycle in the loop for the next object and return to step 510. If 520 there are no more objects, then the old ELOG 242 is released 522, timer OT is reset, and method 500 returns to step 506.

Figure 6:
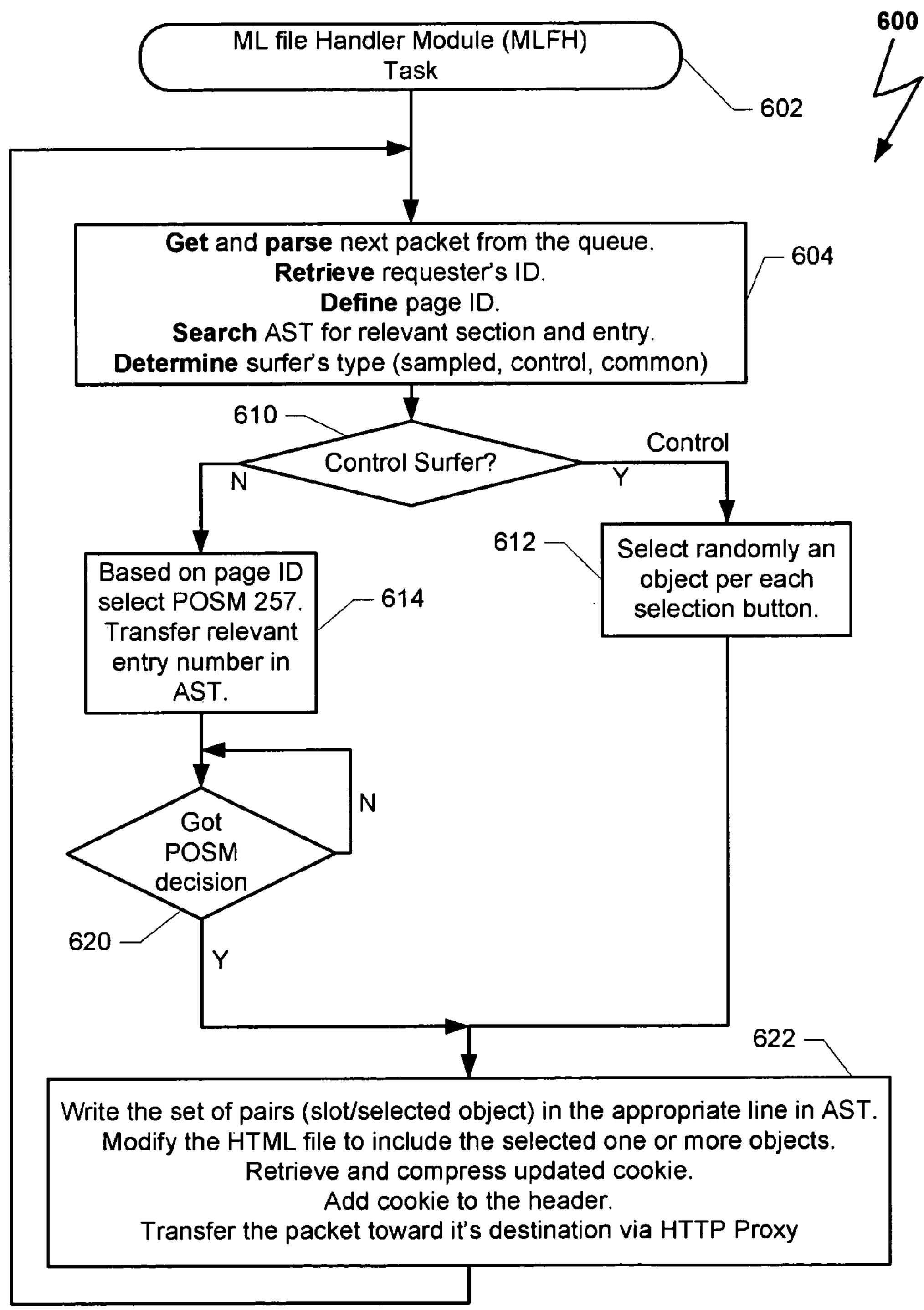
FIG. 6 schematically illustrates a flowchart showing relevant processes of an exemplary embodiment of a method for handling a ML file of a requested web page.

FIG. 6 illustrates a flowchart with relevant processes of an exemplary method 600 that may be used for handling web pages, in the form of markup language files (an HTML, for example), which is sent from one of the content servers 152 (FIG. 1) in response to a surfer's requests. Method 600 may be implemented within the MLFH 230 (FIG. 2), for example. Method 600 may be initialized 602 by the manager module 264 (FIG. 2) during the "power on" process. After initialization, method 600 may run in a loop as long as CAS 200 (FIG. 2) is active. During the initialization process 602, MLFH 230 may be loaded with information that is relevant for communicating with other internal modules of CAS 200, modules such as the manager 264, the plurality of POSM 250 and AST 215 (FIG. 2).

After the initiation stage, method 600 may start processing received web pages that are transferred via HTTP proxy 210 (FIG. 2) to a queue of MLFH 230. The next packet in the queue is fetched 604 and parsed in order to determine whether a cookie is attached. If a cookie is found, the cookie is furthered processed and the requester ID, which is written in the cookie, is retrieved. AST 215 is searched for a section that is associated with the requester ID. The last entry in the requester's section is retrieved and parsed to identify the fields that define a surfer's type, i.e. sampled, common or control. In addition, the page ID is defined by parsing the header of the received web page.

If 610 a surfer is designated as a control surfer, then at step 612, based on the web page ID, a list of optional objects and a list of slots in the web page are fetched. Per each slot, an optional object is selected randomly and method 600 proceeds to step 622.

If 610 the requester of the web page is not designated as a control surfer, then a POSM 257 is selected 614 based on the page ID. The entry number in AST 215 that is associated with the request for the given web page is transferred to a queue of the selected POSM 257. Method 600 may wait 620 until a decision from the relevant POSM 250 is received that identifies the web page configuration that has the highest probability of prompting an active surfer to respond through the selection of one of the optional objects. The identified configuration may include a list of slot and object combinations that have the highest associated probabilities. Then method 600 proceeds to step 622.

At step 622, either the identified configuration of the web page or the randomly selected configuration of the web page, having a set of object and slot combinations, is written 622 to the appropriate fields in the relevant entry of AST 215. The HTML file is modified to include the selected one or more objects, each object being associated with an appropriate slot. The updated cookie, which was prepared by PRM 220 and stored in the entry, is compressed and added as a cookie to the modified ML file. The requester's ID is also added and associated with the cookie. The modified ML file with the cookie is transferred to HTTP proxy 210 and sent toward the destination of the ML file of the requester surfer. Method 600 returns to step 604 and starts processing a new received ML file.

In an alternate embodiment, the set of pairs in the configuration may influence the design of a web page. In such an embodiment, a pair may include a design feature in lieu of a slot and the value of the design feature in lieu of the object. Exemplary design features may be background color, font size, font type, etc. Exemplary corresponding values may be red, 12 points, Times New Roman, etc.

Figure 7:
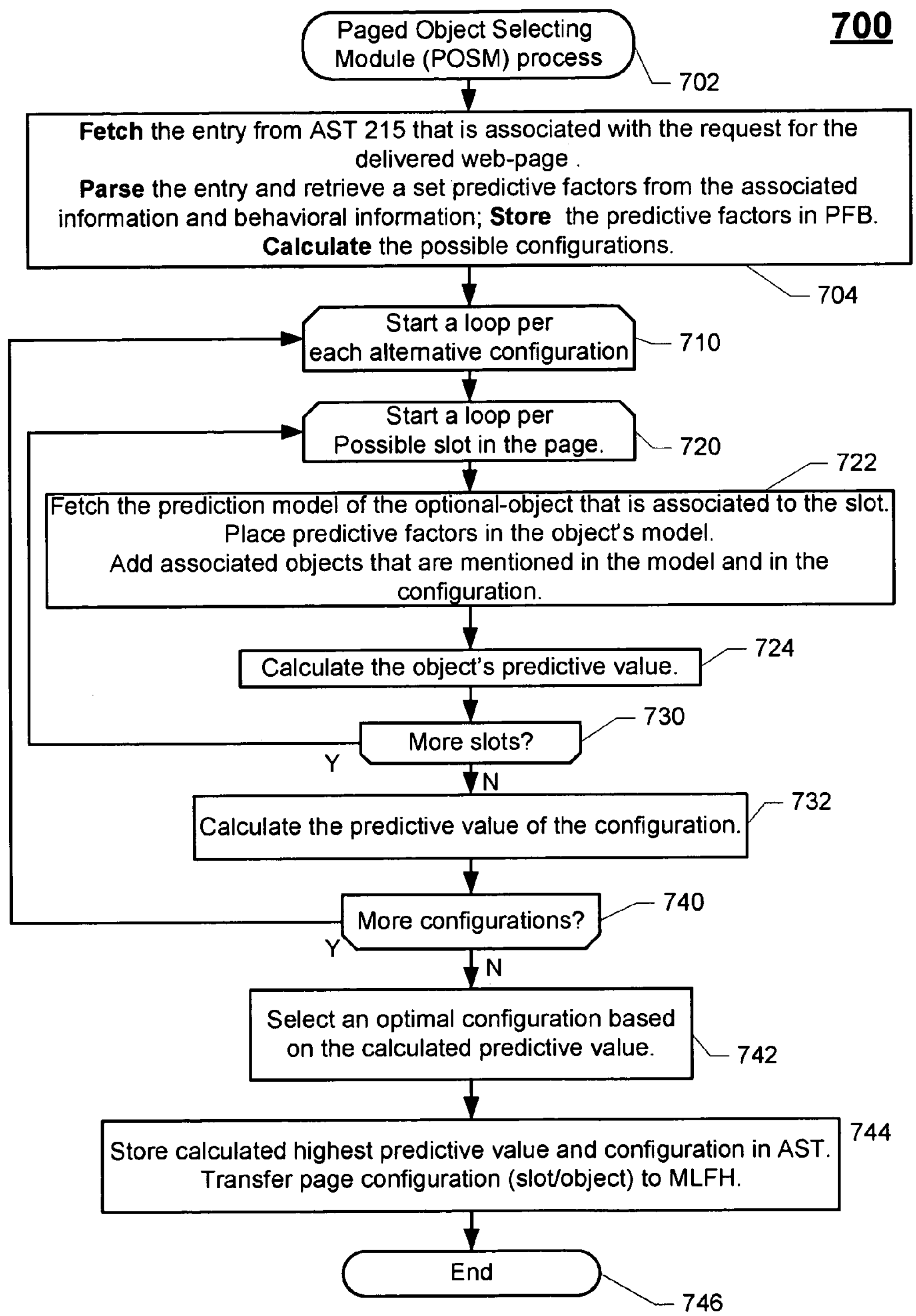
FIG. 7 schematically illustrates a flowchart showing relevant processes of an exemplary embodiment of a method for selecting an optional object to be presented on a requested web page.

FIG. 7 illustrates a flowchart with relevant processes of an exemplary method 700 that may be used for calculating the prediction value for each optional configuration (set of optional-object and slot combinations) from a plurality of optional configurations of a delivered web page. The prediction value may represent the probability that the requester of the delivered web page will respond (select one of the presented objects) while observing the delivered web page. Method 700 may be implemented within the OSP 255 (FIG. 2), for example. Method 700, at a selected POSM 257 that is associated with a delivered web page, may be initialized 702 upon receipt of an entry number in AST 215 (FIG. 2). The entry is associated with the request for the delivered web page that is currently processed (step 614, FIG. 6) by MLFH 230 (FIG. 2).

After initiation, method 700 may fetch 704 the entry from AST 215 that is associated with the request for this delivered web page. The entry may be parsed and a plurality of predictive factors retrieved from the associated information, behavioral information, and grouping information (if such exists). Exemplary predictive factors that may be retrieved from the associated information stored at the entry may include the receipt time of the request, the URL keys associated with the request, etc. Exemplary predictive factors that may be retrieved from the behavioral information may include the elapsed time from the last visit of the requester in ACD 150 (FIG. 1), the number of positive responses from the requester, etc. Exemplary grouping information may include indications on a surfer's attribute such as, but not limited to, gender, age, purchasing habits, etc. Further, the indication may be coded in a code which is unknown to CAS 200 (FIG. 2). Moreover, the predictive factors may be stored in PFB 253 (FIG. 2) of the POSM 250 that is associated with the delivered web page.

The optional configurations of the requested web page are calculated. A configuration may define a set of the slots, in which an optional object may be presented, and a selected optional object that is presented in each slot (Slot/Optional-object). Usually, an exemplary web page has a certain amount of slots and a certain amount of optional-objects such that the number of possible configurations may be defined. The optional configurations may include all possible combinations of slots and objects, for example. A table of prediction values may be allocated 704 for storing the calculated prediction value for each optional configuration.

An exemplary table of prediction values may include a plurality of entries. Each entry may be associated with an optional configuration of the delivered web page. Further, each entry may include a plurality of fields and each field may be associated with a specific slot number with an additional field defining the predicted value of each configuration. Each cell (a junction of a configuration and a slot number) in the table may include the calculated prediction value of the object that is assigned to the slot in that configuration, wherein the calculation of the predictive value is done in view of the rest of the slots and optional-objects in the configuration. The prediction value of the configuration may be the sum of the predictive values of each one of the slot fields in this entry.

In some exemplary embodiments of the present invention, the number of optional configurations may be calculated once, during the initialization of POSM 250 or upon receiving information on changes in the associated web page. In such case, an exemplary table of prediction values may be defined once and allocated again and again each time the relevant web page is delivered.

After allocating the table of prediction values, a loop between steps 710 to 740 may be initiated to process all the possible configurations of the web page written in the allocated table. For each configuration, an internal loop is initiated between steps 720 to 730. The internal loop may be executed per each slot of the configuration. An OPM 257*a-n* (FIG. 2) that is associated with an object that was assigned to a first slot of a first configuration in the table is fetched 722. Relevant predictive factors included in the model are retrieved 722 from PFB 253 and placed in the appropriate location in the model. The model is adapted to reflect the configuration. Therefore, if the model has one or more variables that reflect the configuration (objects in the other slots, etc.), then those variables are defined as true or false depending on the configuration.

Then the predictive value of the object that is associated with the first slot of the first configuration is calculated 724 by executing the model. Next, the calculated predictive value is written in the table's cell at the junction of the first configuration and the first slot and a decision is made 730 as to whether there are additional slots in the configuration. If so, method 700 returns to step 720 and starts the loop for the next slot (a second slot, etc.) in the first configuration. The loop may continue to the third slot and so on until there 730 are no more slots in the configuration. Then, the predictive value of the configuration is calculated 732 by averaging the predictive value of each slot, for example.

At step 740, a determination is made as to whether there are additional optional configurations in the table. If yes, method 700 returns to step 710 and starts the loop for the next configuration (a second configuration, etc) in the table. The loop may continue for the third configuration and so on until there 740 are no more configurations to be processed.

After calculating 740 the predictive value of all the possible configurations of the web page, an optimal configuration is selected 742. Notably, as previously disclosed, the prediction value also reflects the benefit that the owner of CAS 200 will get when a surfer responds to the presented web page via the selection of one of the optional objects. The configuration with the highest predictive value may be defined as the preferred configuration. This preferred configuration, and its predictive value, may be stored 744 in the entry of AST 215 (FIG. 2) and delivered to MLFH 230 (FIG. 2). At this point, method 700 may be terminated 746. Method 700 may be initiated again upon receiving a next delivered web page that is associated with POSM 250.

Figure 8:
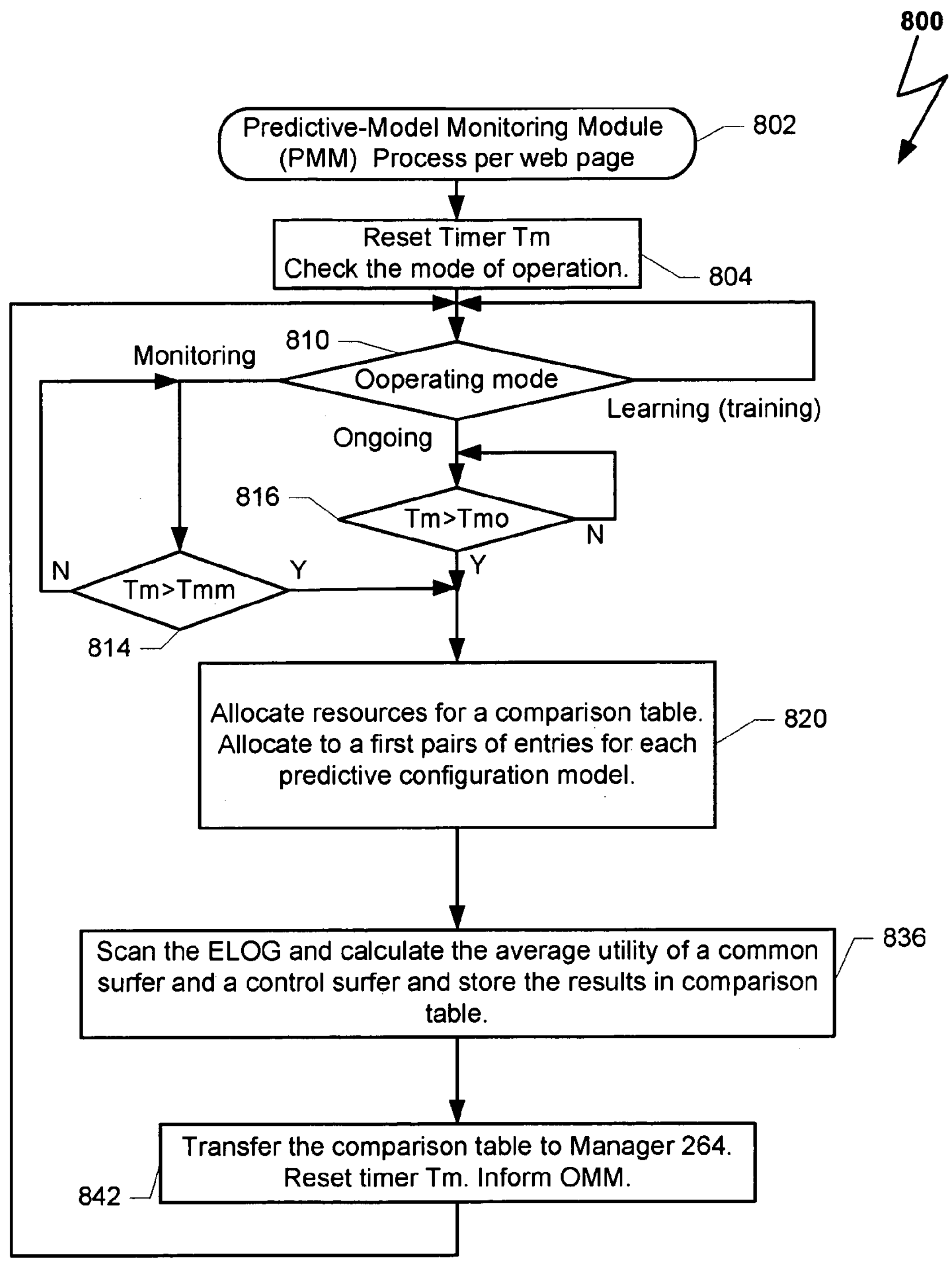
FIG. 8 schematically illustrates a flowchart showing relevant processes of an exemplary embodiment of a method for controlling the predictive models.

FIG. 8 illustrates a flowchart depicting relevant processes of an exemplary method 800 that may be used for monitoring the performance of the current predictive models of a certain web page. Method 800 may be implemented within the PMM 266 (FIG. 2), for example.

Method 800 may be initialized 802 by the manager module 264 (FIG. 2) during the "power on" process. After initiation, method 800 may run in a loop as long as CAS 200 is active. Method 800 may be used for monitoring the results of the stored data at ELOG 242 (FIG. 2), which is assigned to the certain web page being currently monitored, before transferring it to OHDB 248 (FIG. 2). After processing the records stored in ELOG 242, an indication may be sent to OMM 246 of the PDC 240, which is assigned to the web page that is currently monitored. The indication may inform the OMM 246 that it may start the process of transferring the information from ELOG 242 to OHDB 248. In addition, the results of the evaluation may be transferred to the manager module 264 and/or PMB 262. After monitoring the results of one web page, PMM 266 (FIG. 2) may proceed to the next web page and so on. In an alternate embodiment of the present invention, PMM 266 may execute a plurality of processes 800 in parallel, one per each web page.

After initiation, a timer Tm is reset 804 and the current mode of operation, which is defined by the manager module 264 (FIG. 2), is determined. If 810 the operating mode is a "learning" (training) mode, then method 800 may wait until the end of the learning period. If 810 the operating mode is a "monitoring" mode, then method 800 may wait 814 until the value of timer Tm is greater than a configurable value Tmm. Tmm may be in the range of a few minutes to a few tens of minutes, for example. If 810 the operating mode is an "ongoing" mode, then method 800 may wait 816 until the value of timer Tm is greater than a configurable value Tmo. Tmo may be in the range of a few tens of minutes to a few hours, for example.

When timer Tm reaches the value of Tmm or Tmo, depending on the operating mode, a web page comparison table is allocated 820. The web page comparison table may have two entries wherein one may be assigned to the average utility of the control surfer while the other may be assigned to the average utility of the common surfer.

At step 836, the ELOG is scanned and the average utilities of the control surfer and the common surfer are calculated. The results may be written in the web page comparison table at the appropriate entry that is assigned to the relevant surfer.

The web page comparison table is transferred 842 to the manager module 264 (FIG. 2). Timer Tm is reset and indication is sent to OMM 246 (FIG. 2) of the PDC 240, which is assigned to the relevant web page. In response, OMM 246 may start transferring the information from ELOG 242 to OHDB 248 as previously disclosed. At such point, method 800 may return to step 810 and, based on the current mode of operation, may proceed per the methodologies previously disclosed.

Figure 9A:
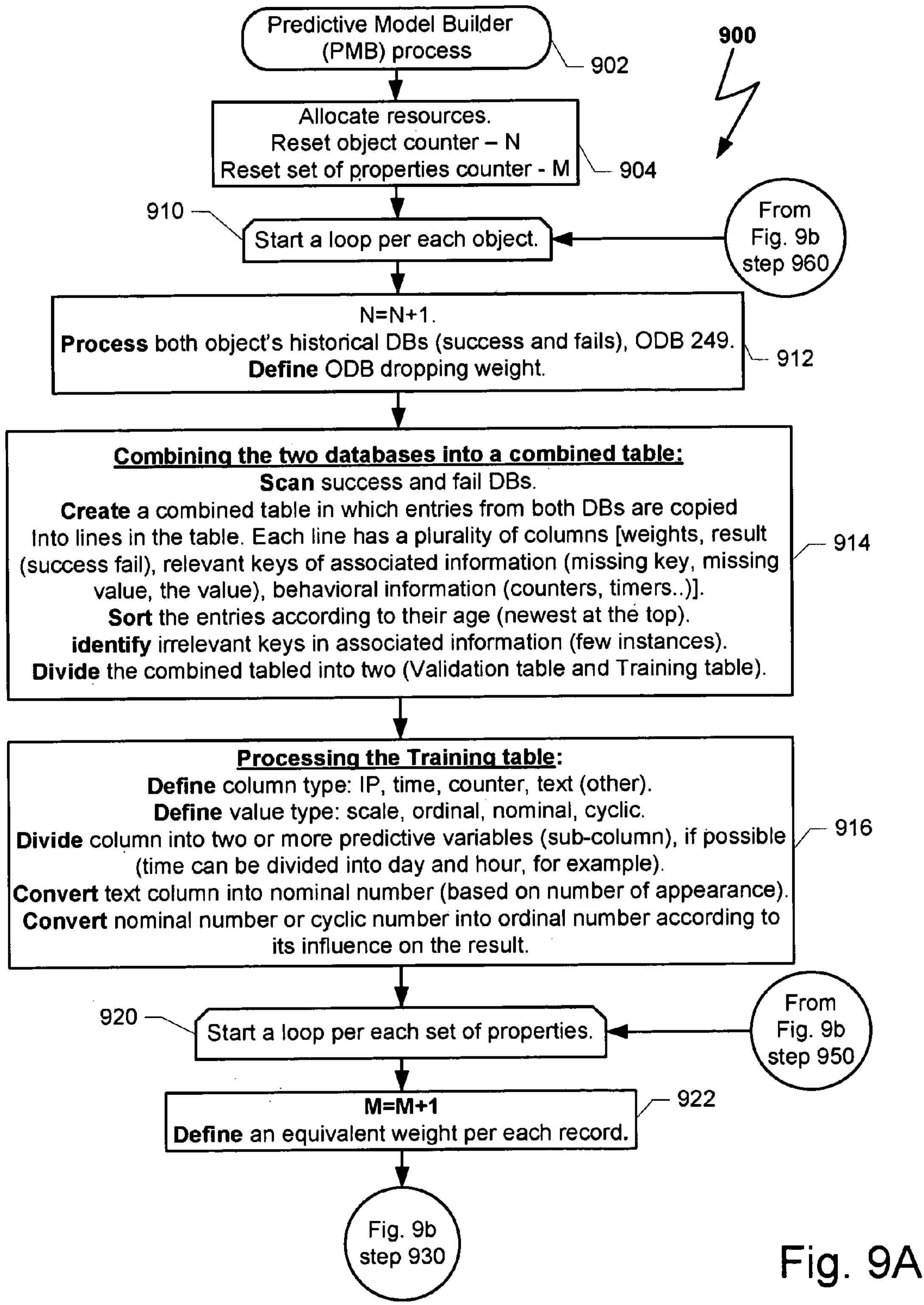
FIGS. 9A & 9B schematically illustrate a flowchart showing relevant processes of an exemplary embodiment of a method for building a predictive model.
Figure 9B:
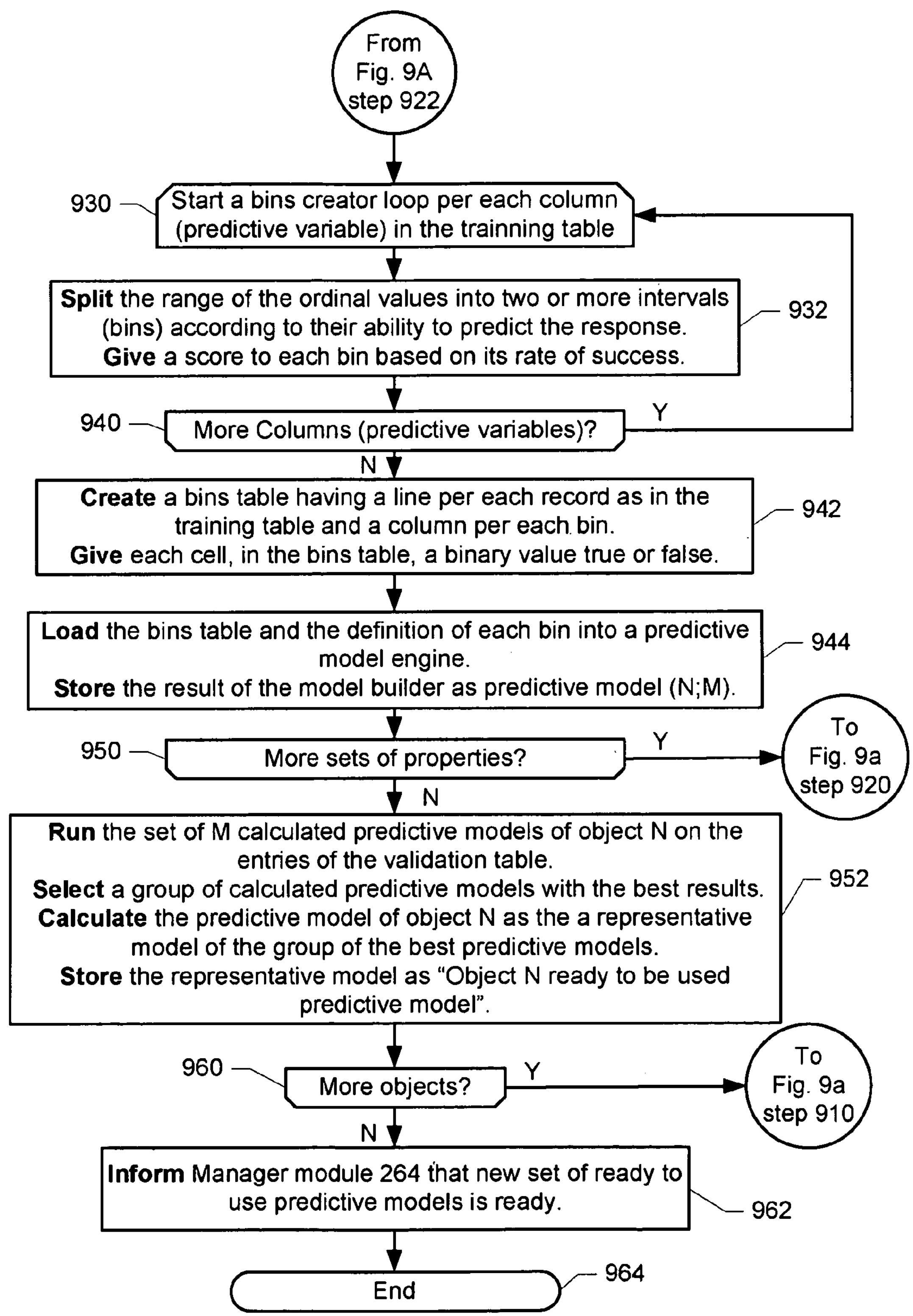

FIG. 9A & 9B illustrate a flowchart depicting relevant processes of an exemplary method 900 that may be used for creating a new set of object's predictive models, one per each optional-object that may be associated with a web page that is served by CAS 200 (FIG. 2). Method 900 may be implemented within the predictive model builder (PMB) 262 (FIG. 2), for example.

Method 900 may be initialized 902 by the manager module 264 (FIG. 2) each time a new set of predictive models is needed. During the initialization process 904, PMB 262 may allocate resources that may be needed for calculation of the predictive models. Information, or memory pointers to information, needed while processing the predictive models may be retrieved. Required counters may be reset. Furthermore, a counter may be used as an index.

When the initial step 904 is completed, an external loop between steps 910 and 960 (FIG. 9*b*) is initiated. Each cycle in the external loop is associated with an optional-object (an alternative object) that may be associated with a web page. At step 912, counter N is incremented by one, indicating the object's number that is currently handled in the current cycle of the loop. The two historical DBs of the object N, 249Ns (success) and 249Nf (failure) (FIG. 2), are processed and a decreased weight per each ODB is calculated based on the deleted portion that was associated to the ODB by OMM 246 (FIG. 2) during the transfer of records from ELOG 242 (FIG. 2) to the ODBs, as previously disclosed above in conjunction with step 516 (FIG. 5).

The raw data from the success and failure ODB 249Ns & 249Nf are organized 914 into an object's table. Each entry from the ODBs 249Ns & 249Nf is copied into a line in the table. The lines are sorted by time, independent of any success indication. The newest record may be stored at the top of the object's table while the oldest record may be stored at the bottom of the object's table, but it should be understood that choice of storage organization should not limit the scope of the invention.

Each record in the table, i.e. line, has a plurality of columns (fields). Each column may be associated with a factor of the record, which is stored in the record. Exemplary columns may be designated to represent the weight of the record (the weight may reflect the decreased weight of the ODB from which the record was copied), the result, success or failure (not success), relevant URL keys that were embedded within the associated information that was stored in the record, attributes indication on the web page and/or the object, etc. Additional columns may reflect the values of behavioral information, which is stored in the record. Other columns may represent information such as counters and timers that were stored in the cookie associated with the request, indications of attributes associated with a surfer that that were stored in the cookie, etc.

The associated information may be the receiving time of the request that is written in the record, the URL that was associated with the request, information regarding the configuration of the web page from which the request was selected, etc. Each cell at the junction of a column and a row may store the URL key's value if it exists, missing key indication if the record does not include the key, or a missing value indication if the record includes the key but no value, for example. Each cell in the junction of a behavioral information factor and a line (record) may store the value of a relevant counter, timer, etc. which are associated with the column.

The object's table may be searched 914 for irrelevant keys (few instances), for example. Irrelevant keys may be defined as keys that have a small number of records (lines) in which the key has a value. The minimum number of records may be a configurable value in the range of a few tens to a few thousands, depending on the volume of data stored in the ODB 249, for example. The minimum number of records may be one of the properties that are stored in a set of properties, for example. A column of irrelevant keys may be removed from the object's table. The object's table may be divided into two tables: a validation table including the newer records and a training table with the older records. Usually, the training table includes more records than the validation table. The validation table may be used later for determining the quality of the predictive models or the score of the model.

The training table is further processed 916 in order to calculate the predictive model of the object. The type of the columns in the training table may be defined. Defining the type may be executed by observing the key in view of a plurality of syntax protocols and determining whether the value of the key complies with one or more of those protocols. Next, the type is defined based on the protocol.

Exemplary protocols may be Internet protocols (IP), text protocols, time protocols, etc. If the value of the key does not comply with any of the protocols, it may be defined as "other." Exemplary types may included IP, time, text, other, etc. Types of columns that are associated with behavioral information are known and may include counters and timers, for example. After defining the type of the keys, the type of the value of each key may be defined. Exemplary types of values may be scale, ordinal, nominal, cyclic, etc.

In some exemplary embodiments, method 900 may further process the training table in order to identify columns that may be divided into two or more. For example, a time column may be divided into multiple columns representing days, hours, and minutes. An IP address may be divided into four columns, etc. Each sub-column (a portion of a predictive factor) may be referred to as a predictive variable or a predictive key.

When the raw data is organized in the training table, method 900 starts converting 916 key values that are not ordinal into ordinal values. A value of a text column (a certain string of text) may be converted into an ordinal number that reflects its frequency (number of appearances along the column). A nominal number or a cyclic number may be converted into an ordinal number that reflects the influence of the nominal value on the result of a record (success or failure).

At this point, the training table is ready to be further processed such that each column (a predictive variable/factor/key) is converted into one or more bins and the training table converted overall into a bins table. The bins table is further processed for determining a predictive model per each set of properties. A middle loop from step 920 to 950 (FIG. 9*b*) may be initiated. Each cycle in the loop is associated with a set of properties. Each set of properties may define and comprise a set of parameters that may be used while preparing a predictive model.

An exemplary parameter may be relative aging weight. Other parameters may define the minimum number of appearances of a certain key, a number below which a key may be considered as irrelevant. Another parameter may define the minimal value of a predictive score that a predictive model may get in order to be used. Yet another parameter may define the half-life-time constant of a record, etc.

The value of M counter is incremented 922 by one indicating the ID number of the set of properties that is associated with the current cycle of the loop. The appropriate set of properties is fetched and parsed and, according to its properties, an equivalent weight per each line may be defined. The equivalent weight may reflect the decreased weight which is due to the result of the record's (line) success or failure, age, the benefit that is created to the owner of CAS 200 (FIG. 2) if the object is selected, etc. After defining the equivalent weight, method 900 proceeds to step 930 (FIG. 9B) and initiates the internal loop between steps 930 to 940.

Each cycle in the internal loop is associated with a column, i.e. a predictive variable. The range of the ordinal values written in the column is divided 932 into one or more subintervals (bins) according to the ability to predict the success. Dividing the range of the values of the column into bins may be executed in several methods. One exemplary method may divide the interval into a configurable number of equal intervals (units). The number of units (the resolution) may be a few units to a few tens of units, for example. The resolution may be one of the properties that are included in a set of properties, for example. A predictive score per each interval unit, along the interval of the values of the current column, may be calculated by dividing the weighted number of success records by the total weighted number of records, which have an ordinal value of the predictive variable (column), in the current interval unit.

The one or more bins may be created 932 by grouping one or more adjacent interval units into one bin, wherein the variance between the rates of success of the adjacent interval units is below a certain value, i.e. a variance threshold. The variance threshold may have a configurable value and may be one of the properties that are stored in a set of properties, for example. After creating one or more bins for each predictive variable (column), a rate of success is calculated for the bin. The rate of success is calculated as the weighted number of success records divided by the weighted total number of records. Information on the bins (information on its predictive variable, the bin's interval, etc.) along with associated prediction scores is stored in a bins legend. Then, a determination is made 940 as to whether the training table includes more columns (predictive variables). If 940 yes, method 900 returns to step 930 and starts a new cycle in the internal loop for dividing the next predictive variable (a next column, in the training table) into one or more bins.

If 940 there are no more columns, then a bins table is created 942. The bins table may have the same number of lines as in the training table and a column per each bin. In each cell, at the junction of a line (record) and a bin (column), a binary value, true or false, may be written depending on the value of the relevant predictive variable.

In another exemplary embodiment of method 900, step 942 may include a validation process. An exemplary validation process may repeat the loop from step 930 to 940 on the records that are stored in the validation table. If the bins that were created by processing the validation table are similar to the bins that were created by processing the training table, then the bins may be considered as valid and method 900 may proceed to step 944. If not, one or more properties in the current set of properties may be slightly modified. For example, the resolution of the range of a certain column may be reduced. Then, the loop from step 930 to 940 may be repeated twice with the modified set of parameters. During the first repetition a second set of bins is calculated using the records stored in the training table. During the second repetition, the second set is validated by using the validation table. The validation process may have one or more cycles. In some exemplary embodiments the bins validation table may have other records than the validation table that is used for validating the predictive models.

Yet another exemplary embodiment of method 900 may respond to non valid sets of bins by marking the set of properties as a problematic one and may jump to step 950, skipping the stage of calculating a predictive model according to the problematic set of parameters. In yet another embodiment, a set of bins may be ignored entirely.

The bins table and the bins legend is transferred 944 toward a predictive model engine. The predictive model engine may implement, over the bins table, a statistical algorithm such as, but not limited to, logistic regression, linear regression, decision tree analysis, etc. The calculated predictive model that was created is stored as a prediction model (N;M). The N stands for the optional-object for which the model was calculated and the M stands for the set of properties that was used for calculating the model.

At step 950, a determination is made as to whether there are more sets of properties. If yes, method 900 returns to step 920 (FIG. 9*a*) and starts a new cycle for creating an additional predictive model, for the object N, based on the next set of properties (M+1). If 950 there are no more sets of properties, then an object's predictive model N is calculated 952 as an equivalent model of the M models that were calculated and stored in step 944.

An exemplary predictive model (N:M) may include one or more constants, one or more predictive variables that are derived from associated information, each having an associated coefficient, one or more predictive variables that are derived from behavioral information, each having an associated coefficient, one or more web page configuration variables that reflect objects in the other slots, each having an associated coefficient.

In some embodiments, additional predictive variables may be used. For example, one or more predictive variables that are derived from web page attributes, surfer's attributes, or object attributes may be included. Exemplary constants may be a result of the regression process (an arithmetic constant), for example. Another constant may reflect the benefit of selecting the object M. Exemplary predictive variables that are derived from associated information may be the day, the browser type, etc. An exemplary predictive variable that is derived from the behavioral information stored in the cookie may be the number of visits to a certain page, etc. An exemplary web page configuration variable may be object X in slot Y, for example.

An exemplary calculation of a predictive value of an object may be executed based on the following formula:

$$P = \frac{1}{1 + e^{-(\text{Sum of relevant coefficients})}}$$

The relevant coefficients are the coefficients that are associated with variables that are true for a received request.

An exemplary method 900 may execute 952 the M models of the optional-object N on the records that are stored in the validation table. The M models may be executed on each record in the validation table that includes the object M in a web page configuration that was sent as a response to the request that initiated the record. After performing the M models on the validation table, a predictive fitness score is calculated per each model. In an alternate embodiment of the present invention, the records that are stored in the validation table plus the records that are stored in the training table may be used in step 952.

PMB 262 may select 952 a group of calculated predictive models out of the M models that have the best scores. Then, the object N predictive model may be calculated as a representative model of the group of the best models. Calculating the representative model may be executed by calculating an average value per each coefficient. The average may be weighted by the predictive score of the selected best models, for example. The representative model may be stored as "object N ready to be used predictive model".

At step 960, a decision is made whether there are additional optional-objects that may be associated with the relevant web page. If yes, method 900 returns to step 910 and start the external loop for calculating a prediction model for a next object (M+1). If there are no more objects, Manager module 264 (FIG. 2) may be informed that a set of object's predictive models for that web page are ready 962 and method 900 may be terminated 964. Method 900 may be initiated again for handling a second web page. In an alternate embodiment of the present invention, several processes 900 may be executed in parallel, one per each web page.

In the description and claims of the present application, each one of the verbs, "comprise", "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware. Software of a logical module may be embodied on a computer readable medium such as but not limited to: a read/write hard disc, CDROM, Flash memory, ROM, etc. In order to execute a certain task, a software program may be downloaded to an appropriate processor as needed.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A method for selecting a configuration of a presently requested web page, wherein the configuration defines a subset of one or more selected objects from a set of objects, the method comprising:

receiving a request for the presently requested web page;

retrieving a predictive information that is related to the request;

storing the retrieved predictive information;

processing the stored predictive information for defining a value for each one of a plurality of predictive factors;

placing the defined value of one or more predictive factors from the plurality of predictive factors in each one of a plurality of predictive models, wherein each predictive model is associated with an object from the set of objects and calculating a predictive value for each one of the objects in the set of objects; and a server automatically selecting one or more objects to be included in the configuration of the presently requested webpage, wherein the expected utility of the configuration has a high value by:

defining one or more possible configurations for the requested webpage;

calculating, per each possible configuration, the expected utility of each one of the objects that are included in each one of the possible configurations in view of other objects that are included in the configuration;

defining the expected utility of the configuration as a function of the calculated expected utility of each one of the objects that are included in the configuration; and selecting the configuration with the highest average of the calculated expected utility of each one of the objects that are included in the configuration as the configuration of the requested webpage.

2. The method of claim 1, wherein at least a portion of the predictive information is obtained by parsing the request.

3. The method of claim 1, wherein the predictive information is a behavioral information, and wherein the behavioral information represents the surfer's past behavior.

4. The method of claim 3, wherein the behavioral information is embedded within a cookie.

5. The method of claim 3, wherein the behavioral information is time dependent.

6. The method of claim 3, wherein the behavioral information includes information selected from a group consisting of: the time of one or more previous visits of the surfer in a domain that includes the requested webpage; the time that the surfer requested a certain web page; the number of the surfer's visits in the domain, the number of times that a certain object has been presented to the surfer, and the number of times that a certain object has been selected by the surfer.

7. The method of claim 1, wherein the predictive information comprises nominal values.

8. The method of claim 1, wherein the predictive information comprises a string of text.

9. The method of claim 1, wherein the predictive information comprises ordinal values.

10. The method of claim 1, wherein the predictive information has cyclic values.

11. The method of claim 1, wherein the predictive information includes information selected from a group consisting of: a surfer's IP address, a receiving time of a request, a browser application used by a surfer and a URL that is associated with a request.

12. The method of claim 1, wherein the expected utility of the configuration reflects the benefit that will be created when the surfer responds to the presented web page by selecting one of the objects from the subset of objects.

13. The method of claim 1, wherein the predictive information includes information on attributes of the surfer that sent the request.

14. The method of claim 1, wherein the predictive information includes information on attributes of the requested web page.

15. The method of claim 1, wherein the set of objects defines page design features.

16. A method for selecting a configuration of a presently requested web page, wherein the configuration defines a subset of one or more selected objects from a set of objects, the method comprising:

receiving a request for the presently requested web page;

retrieving a predictive information that is related to the request;

storing the retrieved predictive information;

processing the stored predictive information for defining a value for each one of a plurality of predictive factors;

placing the defined value of one or more predictive factors from the plurality of predictive factors in each one of a plurality of predictive models, wherein each predictive model is associated with an object from the set of objects and calculating a predictive value for each one of the objects in the set of objects; and a server automatically selecting one or more objects to be included in the configuration of the presently requested webpage, wherein the expected utility of the configuration has a high value by:

defining one or more possible configurations for the requested webpage;

calculating, per each possible configuration, the expected utility of each one of the objects that are included in each one of the possible configurations in view of other objects that are included in the configuration;

defining the expected utility of the configuration as a function of the calculated expected utility of each one of the objects that are included in the configuration; and selecting the configuration with the highest sum of the calculated expected utility of each one of the objects that are included in the configuration as the configuration of the requested webpage.

17. The method of claim 13, wherein the information on attributes of the surfer includes information on at least one attribute selected from a group of attributes consisting of:

gender, age, location, and purchase habits.

18. The method of claim 13, wherein the information on attributes of the requested webpage includes information on at least one attribute selected from a group of attributes consisting of: type of product, page design attributes.

19. The method of claim 1, wherein storing the retrieved predictive information comprises storing the predictive information in an active surfer table.

20. The method of claim 1, wherein storing the retrieved predictive information, further comprises transferring the request towards its destination.

* * * * *